US011902934B2

(12) United States Patent
Liu et al.

(10) Patent No.: US 11,902,934 B2
(45) Date of Patent: Feb. 13, 2024

(54) PAGING ENHANCEMENT FOR NEW RADIO-UNLICENSED (NR-U) LIGHT

(71) Applicant: QUALCOMM INCORPORATED, San Diego, CA (US)

(72) Inventors: Chih-Hao Liu, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 17/249,173

(22) Filed: Feb. 22, 2021

(65) Prior Publication Data
US 2021/0297985 A1    Sep. 23, 2021

Related U.S. Application Data

(60) Provisional application No. 62/990,799, filed on Mar. 17, 2020.

(51) Int. Cl.
*H04W 68/02* (2009.01)
*H04B 1/713* (2011.01)
*H04W 72/23* (2023.01)

(52) U.S. Cl.
CPC ............ *H04W 68/02* (2013.01); *H04B 1/713* (2013.01); *H04W 72/23* (2023.01)

(58) Field of Classification Search
CPC .................... H04L 5/0012; H04W 68/02
See application file for complete search history.

(56) References Cited

U.S. PATENT DOCUMENTS

| 5,940,431 A | * | 8/1999 | Haartsen | ........... H04W 52/0216 |
| | | | | 375/138 |
| 6,223,048 B1 | * | 4/2001 | Noll Barreto | ......... H04B 1/713 |
| | | | | 455/450 |

(Continued)

OTHER PUBLICATIONS

Ericsson: "Remaining Issues on Paging", 3GPP TSG-RAN WG2 #109-e, 3GPP Draft; R2-2000336, 3rd Generation Partnership Project (3GPP), Mobile Competence Centre; 650, Route Des Lucioles; F-06921 Sophia-Antipolis Cedex; France, vol. RAN WG2, No. Electronic meeting; Feb. 24, 2020-Mar. 6, 2020, Feb. 13, 2020 (Feb. 13, 2020), pp. 1-7, XP051848538, Retrieved from the Internet: URL: https://www.3gpp.org/ftp/tsg_ran/WG2_RL2/TSGR2_109_e/Docs/R2-2000336.zip, R2-2000336—Remaining issues on paging. docx [retrieved on Feb. 13, 2020], paragraph [0002].

(Continued)

*Primary Examiner* — Ayaz R Sheikh
*Assistant Examiner* — Tarell A Hampton
(74) *Attorney, Agent, or Firm* — QUALCOMM Incorporated

(57) ABSTRACT

Wireless communications systems and methods related to performing paging operations in a shared radio frequency band (e.g., in a shared spectrum or an unlicensed spectrum) with an improved paging reliability. A first user equipment (UE) determines a frequency hopping pattern for a paging occasion window (POW) in a plurality of frequency subbands within a shared radio frequency band. The first UE monitors for a paging message from a base station (BS) in the POW, where the monitoring includes hopping from at least a first frequency subband of the plurality of frequency subbands to a second frequency subband of the plurality of frequency subbands based on the frequency hopping pattern.

28 Claims, 9 Drawing Sheets

(56) References Cited

U.S. PATENT DOCUMENTS

| | | | | |
|---|---|---|---|---|
| 6,389,057 B1* | 5/2002 | Haartsen | ........... | H04W 52/0216 375/132 |
| 11,569,941 B2* | 1/2023 | Zou | ........... | H04L 5/0092 |
| 2003/0223394 A1* | 12/2003 | Parantainen | ........... | H04W 72/30 370/347 |
| 2009/0176514 A1* | 7/2009 | Choi | ........... | H04W 68/02 455/458 |
| 2010/0128646 A1* | 5/2010 | Gao | ........... | H04W 68/00 370/312 |
| 2015/0031382 A1* | 1/2015 | Damnjanovic | ... | H04W 52/0216 455/574 |
| 2015/0043523 A1 | 2/2015 | Luo et al. | | |
| 2016/0135141 A1* | 5/2016 | Burbidge | ........... | H04W 68/02 455/458 |
| 2018/0020432 A1* | 1/2018 | Rico Alvarino | ...... | H04W 72/23 |
| 2018/0070332 A1* | 3/2018 | Chen | ........... | H04W 72/23 |
| 2018/0097541 A1* | 4/2018 | Bhattad | ........... | H04W 4/70 |
| 2018/0367185 A1* | 12/2018 | Yi | ........... | H04B 1/7143 |
| 2019/0007946 A1* | 1/2019 | Yerramalli | ........... | H04W 16/14 |
| 2019/0028143 A1* | 1/2019 | Zhang | ........... | H04W 74/04 |
| 2019/0028999 A1* | 1/2019 | Yerramalli | ........... | H04B 1/7143 |
| 2019/0036665 A1* | 1/2019 | Park | ........... | H04L 5/0091 |
| 2019/0132817 A1* | 5/2019 | Liu | ........... | H04W 68/02 |
| 2020/0084747 A1* | 3/2020 | Hong | ........... | H04W 68/02 |
| 2020/0169955 A1* | 5/2020 | Chang | ........... | H04W 4/70 |
| 2020/0280955 A1* | 9/2020 | Liu | ........... | H04W 68/005 |
| 2020/0322918 A1* | 10/2020 | Shih | ........... | H04W 76/11 |
| 2021/0076449 A1* | 3/2021 | Tirucherai Muralidharan | ........... | H04L 1/08 |

OTHER PUBLICATIONS

International Search Report and Written Opinion—PCT/US2021/019139—ISA/EPO—dated Jun. 9, 2021.
Nokia., et al., "Paging in NR-U ", 3GPP TSG-RAN WG2 Meeting #108, 3GPP Draft; R2-1915058, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 18, 2019-Nov. 22, 2019, Nov. 8, 2019 (Nov. 8, 2019), 3 Pages, XP051816983, Retrieved from the Internet: URL: https://www.3gpp.org/ftp/TSG_RAN/WG2_RL2/TSGR2_108/Docs/R2-1915058.zip, R2-1915058 Paging in NR-U.docx [retrieved on Nov. 8, 2019], The whole document.

* cited by examiner

PAGING ENHANCEMENT FOR NEW RADIO-UNLICENSED (NR-U) LIGHT

CROSS REFERENCE TO RELATED APPLICATIONS

The present application claims priority to and the benefit of U.S. Provisional Patent Application No. 62/990,799, filed Mar. 17, 2020, which is hereby incorporated by reference in its entirety as if fully set forth below and for all applicable purposes.

TECHNICAL FIELD

This application relates to wireless communication systems, and more particularly to performing paging operations in a shared radio frequency band (e.g., in a shared spectrum or an unlicensed spectrum) with an improved paging reliability.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may perform LBT to determine whether there are active transmissions in the channel. If the LBT results in a LBT pass, the transmitting node may transmit a preamble to reserve a channel occupancy time (COT) in the shared channel and may communicate with a receiving node during the COT.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes determining, by a first user equipment (UE), a frequency hopping pattern for a paging occasion window (POW) in a plurality of frequency subbands within a shared radio frequency band; and monitoring, by the first UE, for a paging message from a base station (BS) in the POW, where the monitoring includes hopping from at least a first frequency subband of the plurality of frequency subbands to a second frequency subband of the plurality of frequency subbands based on the frequency hopping pattern.

In an additional aspect of the disclosure, a method of wireless communication, includes determining, by base station (BS), a frequency hopping pattern for a paging occasion window (POW) in a plurality of frequency subbands within a shared radio frequency band; and performing, by the BS, paging operations in the POW for at least a first user equipment (UE) in the POW, where the performing the paging operations includes hopping from at least a first frequency subband of the plurality of frequency subbands to a second frequency subband of the plurality of frequency subbands based on the frequency hopping pattern.

In an additional aspect of the disclosure, a first user equipment (UE) includes a processor configured to determine a frequency hopping pattern for a paging occasion window (POW) in a plurality of frequency subbands within a shared radio frequency band; and monitor for a paging message from a base station (BS) in the POW, where the monitor includes hopping from at least a first frequency subband of the plurality of frequency subbands to a second frequency subband of the plurality of frequency subbands based on the frequency hopping pattern.

In an additional aspect of the disclosure, a base station (BS) includes a processor configured to determine, by base station (BS), a frequency hopping pattern for a paging occasion window (POW) in a plurality of frequency subbands within a shared radio frequency band; and perform paging operations in the POW for at least a first user equipment (UE) in the POW, where the processor configured to perform the paging operations is further configured to hopping from at least a first frequency subband of the plurality of frequency subbands to a second frequency subband of the plurality of frequency subbands based on the frequency hopping pattern.

In an additional aspect of the disclosure, a non-transitory computer-readable medium having program code recorded thereon, the program code including code for causing a first user equipment (UE) to determine a frequency hopping pattern for a paging occasion window (POW) in a plurality of frequency subbands within a shared radio frequency band; and code for causing the first UE to monitor for a paging message from a base station (BS) in the POW, where the monitor includes hopping from at least a first frequency subband of the plurality of frequency subbands to a second frequency subband of the plurality of frequency subbands based on the frequency hopping pattern.

In an additional aspect of the disclosure, a non-transitory computer-readable medium having program code recorded thereon, the program code including code for causing a base station (BS) to determine, by base station (BS), a frequency hopping pattern for a paging occasion window (POW) in a plurality of frequency subbands within a shared radio frequency band; and code for causing the BS to perform paging operations in the POW for at least a first user equipment (UE) in the POW, where the code for causing the BS to perform the paging operations is further configured to hopping from at least a first frequency subband of the plurality of frequency subbands to a second frequency subband of the plurality of frequency subbands based on the frequency hopping pattern.

In an additional aspect of the disclosure, a first user equipment (UE) including means for determining a frequency hopping pattern for a paging occasion window (POW) in a plurality of frequency subbands within a shared radio frequency band; and means for monitoring for a paging message from a base station (BS) in the POW, where the monitor includes hopping from at least a first frequency subband of the plurality of frequency subbands to a second frequency subband of the plurality of frequency subbands based on the frequency hopping pattern.

In an additional aspect of the disclosure, a base station (BS) including means for determining, by base station (BS), a frequency hopping pattern for a paging occasion window (POW) in a plurality of frequency subbands within a shared radio frequency band; and means for performing paging operations in the POW for at least a first user equipment (UE) in the POW, where the means for performing the paging operations is further configured to hopping from at least a first frequency subband of the plurality of frequency subbands to a second frequency subband of the plurality of frequency subbands based on the frequency hopping pattern.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
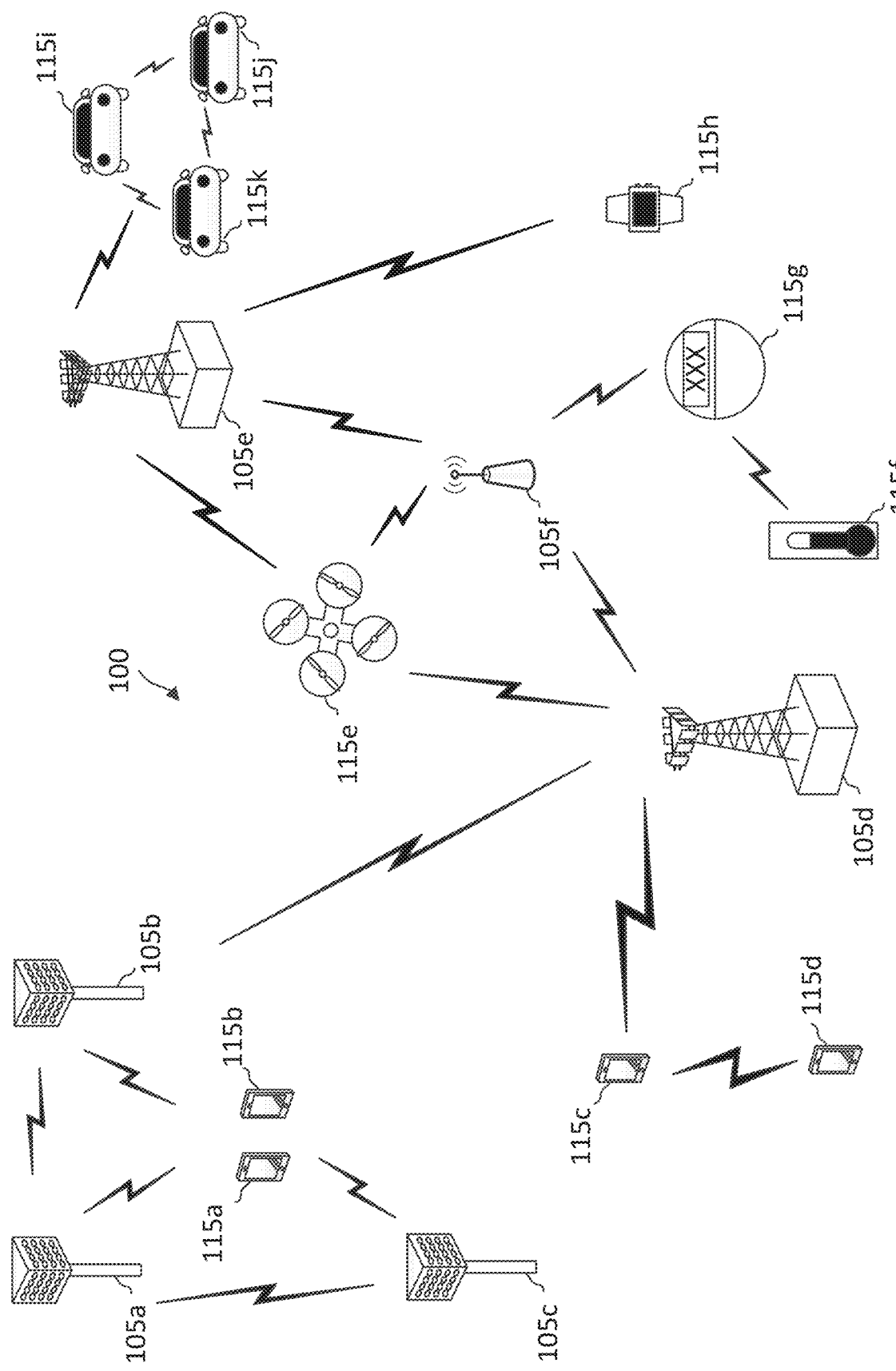
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR in an unlicensed band may be referred to as NR-U. Certain deployments may deploy a lighter version of NR-U with a lower complexity and/or reduced functionalities, for example, for narrowband operations, IoT applications, and/or industrial IoT (IIOT) applications. Some examples of IIOT applications may include industrial equipment automation, smart meter, smart power, smart sensors, and/or the like. The lighter version of NR-U may be referred to as NR-U light. To facilitate narrowband operations, an NR-U light deployment may partition an unlicensed frequency band into multiple frequency channels or frequency subbands. For instance, an NR-U light deployment operating over an 80 megahertz (MHz) unlicensed band may partition the 80 MHz band into about four frequency subbands of 20 MHz each. A BS may perform a listen-before-talk (LBT) in each frequency subband to contend for a transmission opportunity and may communicate with a UE in a frequency subband with a successful LBT. Interference can have a greater impact in a narrowband than in a wideband (e.g., about 80 MHz or 100 MHz). For instance, narrowband interference may impact a small portion of a wideband, but may block a large portion of a narrowband. When a BS operates over a frequency subband (e.g., with a bandwidth of about 20 MHz) and the frequency subband is impacted by persistent interference, the BS may not be able to pass an LBT. To provide ultra-reliability, for example, for IIOT, the BS may apply frequency-hopping to mitigate interference.

In some NR-U light deployments, a BS may apply frequency-hopping to an initial BWP where the BS may broadcast synchronization signals and/or system information signals to assist UEs in network access. Additionally, the BS may perform paging operations over the initial BWP. Paging is a mechanism that enables a BS to notify an idle mode UE when the BS has a paging message for the UE. An idle mode UE may refer to a UE that does not have active data communication ongoing with a BS and may be operating in a paging cycle or a discontinuous reception (DRX) cycle. The DRX cycle may determine how often the UE may wake up to monitor for paging messages from the BS. Upon detecting a paging message, the UE may decode the content of the paging message and initiate any applicable procedures for processing the content. While the BS may apply frequency-hopping to the initial BWP, the frequency-hopping may be a long-term frequency-hopping. For instance, the per frequency hop dwell time for the initial BWP may be long (e.g., tens of milliseconds (ms)) compared to the duration of a paging occasion (e.g., about 0.5 ms or about 1 ms). In other words, the BS may operate in the same frequency subband without switching to another frequency subband for the duration of a paging occasion. As such, the long-term frequency-hopping is unable to address a paging occasion being blocked by interference.

The present application describes mechanisms for performing paging in a shared radio frequency band (e.g., in a shared spectrum or an unlicensed spectrum) with an improved paging reliability. The frequency band may be partitioned into a plurality of subbands. A BS may perform paging operations with an idle mode UE by hopping from at least a first frequency subband of the plurality of frequency subbands to a second frequency subband of the plurality of frequency subbands. The frequency-hopping may include short-term frequency-hopping within a paging occasion or a paging occasion window (POW) and long-term initial BWP hopping. A POW may include a plurality of PDCCH monitoring occasions for paging. Each PDCCH monitoring occasion may be associated with a synchronization signal block (SSB). For instance, a subset of the PDCCH monitoring occasions in the POW may be associated with a SSB of index 0 and another subset of the PDCCH monitoring occasions in the POW may be associated with a SSB of index 1. The short-term frequency-hopping may include a frequency offset pattern that can be applied to each subset of the PDCCH monitoring occasions associated with a certain SSB. The frequency offset pattern may include a frequency subband offset for each PDCCH monitoring occasion within a subset of the plurality of PDDCH monitoring occasions associated with a certain SSB. The frequency subband offset can be added to an initial BWP. For instance, an initial BWP hopping pattern may be represented by c(k), where k represents the $k^{th}$ initial BWP hop, and the paging frequency offset pattern may be represented by p(i), where i represents the $i^{th}$ PDCCH monitoring occasion associated with a certain SSB within a POW. Thus, the BS may determine a frequency subband for an $i^{th}$ PDCCH monitoring occasion in a subset of PDCCH monitoring occasions associated with a certain SSB within a POW by adding p(i) to c(k). In some aspects, the paging frequency offset pattern can be predetermined. In some aspects, the initial BWP hopping pattern c(k) can be cell-specific or UE-specific and the paging frequency offset pattern p(i) can be common for a group of UEs within a POW.

In some aspects, the BS may instruct an idle mode UE to enable or disable the short-term paging frequency-hopping within a POW, for example, by signaling a system information block (SIB). In some aspects, the idle mode UE may monitor for a paging message from the BS by hopping from at least a first frequency subband of the plurality of frequency subbands to a second frequency subband of the plurality of frequency subbands according to the paging frequency offset pattern p(i) and the initial BWP hopping pattern c(k). For instance, the idle mode UE may determine a frequency subband for an it PDCCH monitoring occasion in a subset of PDCCH monitoring occasions associated with a certain SSB within a POW by adding p(i) to c(k). In some aspects, the UE may terminate paging monitoring early in a POW. For instance, the UE may refrain from performing additional frequency-hopping upon detecting a paging PDCCH, a paging message, or a paging PDCCH indicating a paging stop indication in the second frequency subband.

In some aspects, the BS may offload or distribute idle mode UEs to different frequency subbands in the shared radio frequency band. The BS may configure a UE with a first initial BWP and a corresponding first initial BWP hopping pattern for the offloading while the UE is in a connected mode, for example, via UE dedicated signaling. In some aspects, the BS may determine the first initial BWP and/or the corresponding first initial BWP pattern based on a UE group ID associated with a group of UEs including the connected mode UE. In some instance, the BS may determine a new initial BWP hopping pattern for the offloading. In some instance, the BS may determine the first initial BWP hopping pattern for the offloading by adding a UE group dependent frequency subband offset to a cell-specific initial BWP hopping pattern. The UE may switch to the first initial BWP before entering an idle mode. When the UE reselects to a new cell while operating in the idle mode, the UE may monitor for paging in the new cell or target cell based on an initial BWP hopping pattern broadcasted in the target cell, for example, via SIB signaling In some other aspects, the BS may offload or distribute idle mode UEs to different frequency subbands by configuring a UE to autonomously switch to a first initial BWP with a first initial BWP hopping pattern, for example, according to a UE group ID associated with the UE. Accordingly, the UE may autonomously switch to the first initial BWP before entering an idle mode. The UE may determine the first initial BWP and the first initial BWP hopping pattern based on the UE group ID. When the UE reselects to a new cell while operating in an idle mode, the UE may disregard an initial BWP hopping pattern broadcasted in the target cell and continue to utilize the first UE group-specific initial BWP hopping pattern for idle mode operations in the new cell. For example, the source BS may coordinate with a target BS in the new cell so that the target BS may perform idle mode operations based on the first UE group-specific initial BWP hopping pattern.

Aspects of the present disclosure can provide several benefits. For example, the addition of short-term paging frequency-hopping within a POW can increase the chances of a BS passing an LBT in a frequency subband of the shared radio frequency band and transmitting a paging message to an idle mode UE. The offloading of idle mode UEs to different initial BWPs with different initial BWP hopping patterns may allow the BS to support a larger number of idle mode UEs. Additionally, the offloading can mitigate interference, and thus improving network reliability.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 may initiate an initial network attachment procedure with the network 100. When the UE 115 has no active data communication with the BS 105 after the network attachment, the UE 115 may return to an idle state (e.g., RRC idle mode). Alternatively, the UE 115 and the BS 105 can enter an operational state or active state, where operational data may be exchanged (e.g., RRC connected mode). In the connected mode, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, the network 100 may be a NR-U network operating over a wideband, for example, with a BW of about 100 MHz. A BS 105 may configure a wideband UE 115 to monitor PDCCH search space across the 100 MHz wideband. A PDCCH search space may refer to a set of time-frequency resources where a BS 105 may transmit downlink control information (DCI). The DCI may include a UL scheduling grant and/or a DL scheduling grant that schedules a UE 115 for UL and/or DL communications, respectively. In some aspects, the BS 105 may partition the 100 MHz wideband into about five LBT subbands of about 20 MHz each. The BS 105 may perform an LBT in each LBT subband and may communicate with a UE 115 in a LBT subband that passes an LBT. The UE 115 may monitor each LBT subband for a communication (e.g., a PDCCH scheduling grant) from the BS 105. The partitioning of the wideband into multiple subbands can provide robustness against subband interference. For instance, if one subband is blocked, the BS 105 can communicate with a UE 115 in another subband that is not blocked by interference.

In some aspects, the network 100 may be a NR-U light network or any network that operates over a narrowband frequency subband or channel. For instance, the network 100 may partition a system bandwidth into a plurality of frequency subbands. To mitigate subband interference, a BS 105 may apply long-term frequency-hopping to an initial BWP. The long-term frequency-hopping may have a per hop dwell time in the order of tens of ms (e.g., 10 ms, 20 ms, 30 ms, 40 ms or more). An initial BWP may refer to a BWP where the BS 105 may transmit system information signals (e.g., PSS, SSS, PBCH, and/or MIB) to assist a UE 115 in accessing the network 100, perform random access procedures (e.g., exchange of MSG1, MSG2, MSG3, and/or MSG4), and/or paging for idle mode UEs 115. The BS may hop across the plurality of subbands for initial BWP operations. To further mitigate subband interference for paging, the BS 105 may apply short-term frequency-hopping within the duration of a paging occasion. For instance, the short-term frequency-hopping may have a per-hop dwell time that is less than about 2 ms (e.g., about 0.5 ms to about 1 ms). Mechanisms for applying short-term frequency-hopping for paging operations are described in greater detail herein.

Figure 2:
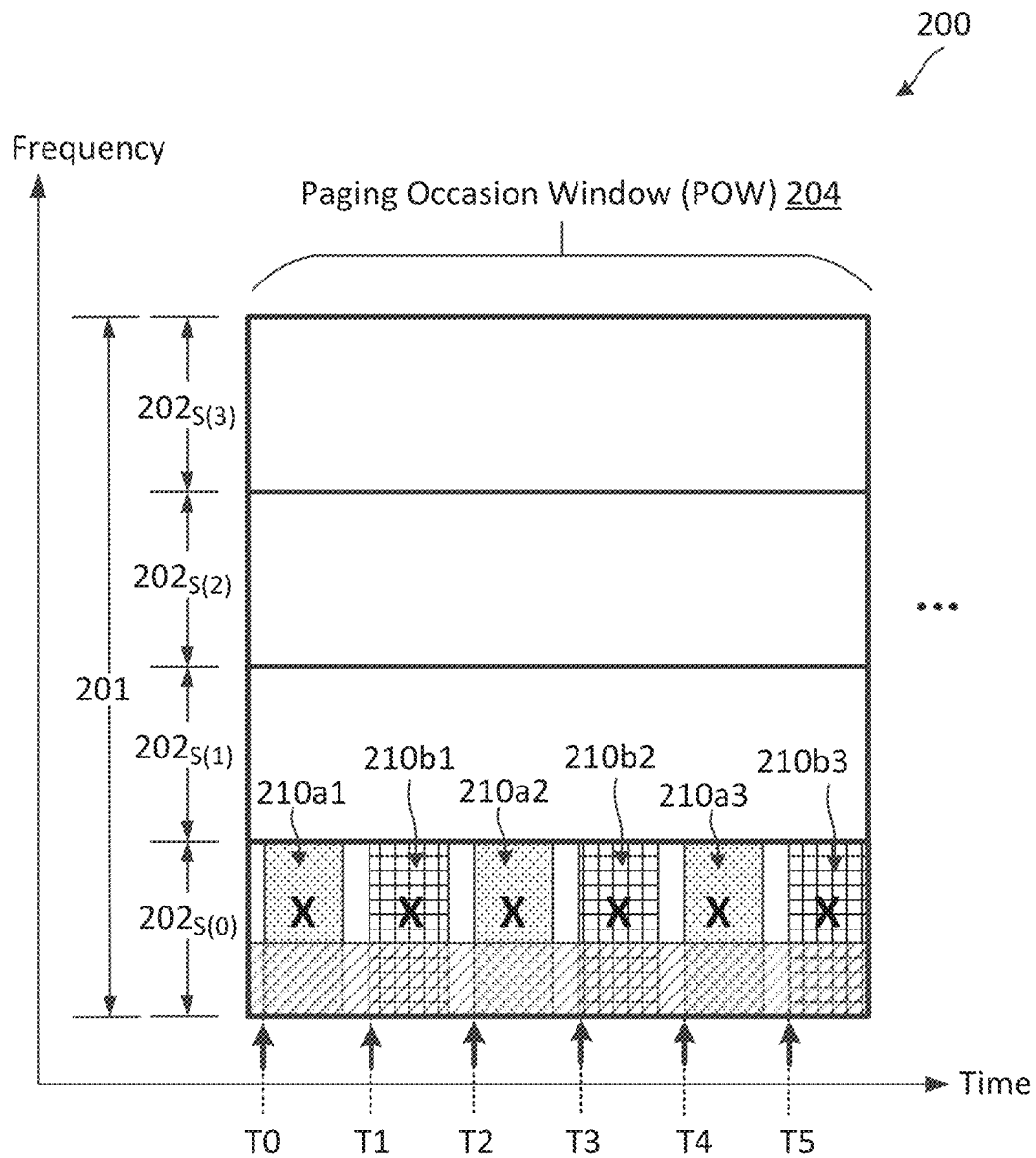
FIG. 2 illustrates a paging scheme according to some aspects of the present disclosure.

FIG. 2 illustrates a paging scheme 200 according to some aspects of the present disclosure. The scheme 200 may be employed by BSs such as the BSs 105 and UEs such as the UEs 115 in a network such as the network 100. In particular, a BS may perform paging operations with an idle mode UE in a shared radio frequency band (e.g., in a shared spectrum or an unlicensed spectrum) as shown in the scheme 200. In FIG. 2, the x-axis represents time in some arbitrary units, and the y-axis represents frequency in some arbitrary units.

In the scheme 200, a shared radio frequency band 201 is partitioned into a plurality of subchannels or frequency subbands 202 (shown as $202_{S(0)}$, $202_{S(1)}$, $202_{S(2)}$, $202_{S(3)}$). The frequency band 201 may be at any suitable frequencies (e.g., at about 2.4 GHz, 5 GHz, 6 GHz or higher) and may have any suitable bandwidth (e.g., about 80 MHz, 100 MHz, or higher). In some aspects, the frequency band 201 may have a BW of about 80 MHz and may be partitioned into about four frequency subbands $202_{S(0)}$, $202_{S(1)}$, $202_{S(2)}$, $202_{S(3)}$ each having a BW of about 20 MHz. The frequency band 201 may be shared by multiple network operating entities of same radio access technologies (RATs) or different RATs. For instance, the frequency band 201 may be shared by NR-U, NR-U light, IEEE 802.11 wireless local area network (WLAN) or WiFi, and/or license assisted access (LAA).

A BS (e.g., the BSs 105) may establish a connection with a UE (e.g., the UEs 115) and communicate with the UE over the established connection. When the UE has no active data communication with the BS, the UE may enter an idle mode. The UE may power down certain frontend components during the idle mode to save power and may wake up during a paging occasion to monitor for a paging message from the BS. The BS may configure the UE with a DRX cycle or a paging cycle. Each DRX cycle may include one paging occasion. The BS may configure the UE with a set of PDCCH monitoring occasions for each paging occasion. If the BS receives data for the UE while the UE is in an idle mode, the BS may send a paging message to the UE during a paging occasion of the UE. The BS may perform an LBT prior to sending a paging message and may send the paging message based on an LBT pass. If the UE detects a paging message from the BS, the UE may decode the content of the paging message and initiate any applicable procedures for processing the content. To page a UE, the BS may send a PDCCH with a paging signature during a PDCCH monitoring occasion within a paging occasions. The paging signature may be a predetermined sequence and the PDCCH may be scrambled with the predetermined sequence. In context of NR, the paging signature may be referred to as a paging-radio network temporary identifier (P-RNTI). The paging PDCCH may indicate that the scheduling grant in the PDCCH is for paging.

In the scheme 200, the BS may configure the UE with one or more paging occasions in an initial BWP. The BS may configure the initial BWP in any one of the frequency subbands 202. For instance, the BS may configure the initial BWP to be in the frequency subband $202_{S(0)}$. Each paging occasion may include a POW 204. Each paging occasion or POW 204 may include a set of consecutive PDCCH monitoring occasions 210 (shown as 210a1, 210b1, 210a2, 210b2, 210a3, and 210b3). Each PDCCH monitoring occasion 210 may be associated with a SSB (e.g., including PSS, SSS, PBCH signals). In some aspects, a paging occasion or POW 204 may include S×X consecutive PDCCH monitoring occasions 210, where S represents the number of SSBs transmitted by the BS and X represents the number of PDCCH monitoring occasions associated with each SSB. In the context of NR, the BS may transmit a system information block Type 1 (SIB1) including a ssb-PositionInBurst parameter field indicating a value for the S parameter. The BS may also configure the UE with a numPDCCHMonitoringOccasionPerSSB parameter field indicating a value for the X parameter. If the X parameter is not configured for the UE, the UE may set the parameter X to a value of 1.

In the illustrated example of FIG. 2, S may have a value of 2 and X may have a value of 3. For instance, the PDCCH monitoring occasions 210a1, 210a2, and 210a3 are associated with an SSB of index 0 transmitted by the BS. The PDCCH monitoring occasions 210b1, 210b2, and 210b3 are associated with an SSB of index 1 transmitted by the BS. The SSB of index 0 may be referred to as SSB 0. The SSB of index 1 may be referred to as SSB 1. In some aspects, the BS may transmit the SSB 0 in a first spatial direction or beam direction and may transmit the SSB 1 in a second spatial direction different from the first spatial direction, for example, when the BS operates over a sub-6 GHz band or a mmWave band. As such, the BS may transmit PDCCH during a PDCCH monitoring occasion 210 in a spatial direction according to a spatial direction of an SSB associated with the PDCCH monitoring occasion 210. Accordingly, the UE may monitor for PDCCH from the BS during a PDCCH monitoring occasion 210 in a spatial direction in accordance with a spatial direction of an SSB associated with the PDCCH monitoring occasion 210. For instance, if the BS transmits a paging PDCCH during the PDCCH monitoring occasions 210a1, 210a2, or 210a3, the BS may transmit the paging PDDCH in a spatial direction corresponding to the spatial direction of the transmitted SSB 0. The UE may perform PDCCH monitoring during the PDCCH monitoring occasions 210a1, 210a2, and/or 210a3 in a spatial direction corresponding to the spatial direction where the BS transmitted the SSB 0.

In some aspects, the BS may determine to page the UE while the UE is in an idle mode, for example, upon detecting data for the UE. The BS may page the UE by sending a paging message to the UE in a configured paging occasion (e.g., the POW 204). The BS may perform an LBT prior to a PDCCH monitoring occasion 210 (e.g., at time TO prior to the PDCCH monitoring occasion 210a1) in the POW 204. If the LBT passes, the BS may send a PDCCH (e.g., with a P-RNTI) during the PDCCH monitoring occasion 210 to indicate a paging message transmission schedule. If the LBT fails, the BS may refrain from transmitting in the PDCCH monitoring occasion 210. The BS may perform another LBT in a subsequent PDCCH monitoring occasion 210 (e.g., the PDCCH monitoring occasion 210b1).

In some instances, the frequency subband $202_{S(O)}$ (where the initial BWP is configured) can be impacted by interference 220. The interference 220 may occupy a substantial portion of the frequency subband $202_{S(O)}$ and can be persistent, for example, lasting over the entire duration of the POW 204. As such, the BS may fail LBTs at time T1, T2, T3, T4, and T5 for all of the PDCCH monitoring occasions 210a1, 210b1, 210a2, 210b2, 210a3, and 210b3, respectively, in the POW 204 (shown by the cross symbols, "X").

While the BS may apply frequency-hopping to the initial BWP (e.g., the frequency subband $202_{S(O)}$) to avoid the interference 220, the initial BWP hopping may be a long-term frequency-hopping. A long-term frequency-hopping may refer to a frequency-hopping where each frequency-hop may have a duration greater than a certain time threshold (e.g., about 10 ms). For instance, each frequency-hop in a long-term frequency-hopping may have a duration in the order of tens of milliseconds (e.g., about 10 ms, 20 ms, 30 ms, 40 ms or more). As such, even if frequency-hopping is applied to the initial BWP, the time duration for each frequency hop, which may be referred to as a per frequency hop dwell time, may be substantially longer than the duration of a POW 204, which may be less than about 2 ms long. Thus, in the example of FIG. 2, the benefits of frequency-hopping to avoid the interference 220 are not achieved for paging within the POW 204. In other words, long-term initial BWP hopping may be unable to address the POW 204 being blocked by the persistent interference 220. Additionally, missing a paging occasion or POW 204 can introduce delay of at least one DRX cycle since the BS may not page the UE until the next DRX cycle.

Accordingly, the present disclosure provides techniques for improving paging reliability by applying short-term frequency-hopping within a POW.

Figure 3:
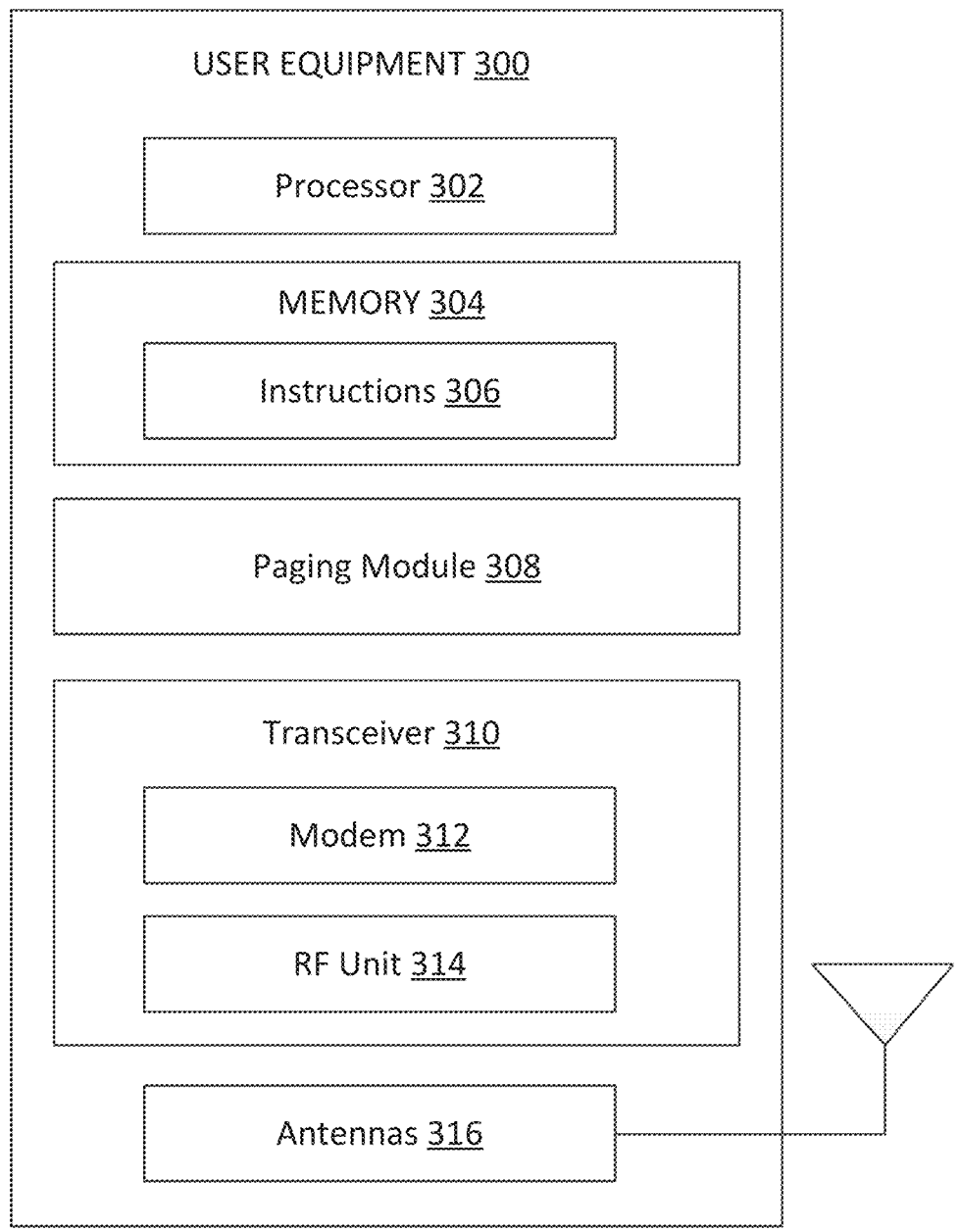
FIG. 3 is a block diagram of a user equipment (UE) according to some aspects of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a paging module 308, a transceiver 310 including a modem subsystem 312 and a radio frequency (RF) unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 1-2 and 5-8. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The paging module 308 may be implemented via hardware, software, or combinations thereof. For example, the paging module 308 may be implemented as a processor, circuit, and/or instructions 306 stored in the memory 304 and executed by the processor 302. In some instances, the paging module 308 can be integrated within the modem subsystem 312. For example, the paging module 308 can be implemented by a combination of software components (e.g., executed by a DSP or a general processor) and hardware components (e.g., logic gates and circuitry) within the modem subsystem 312.

The paging module 308 may be used for various aspects of the present disclosure, for example, aspects of FIGS. 1-2 and 5-8. For instance, the paging module 308 is configured to determine a frequency-hopping pattern for a POW in a plurality of frequency subbands within a shared radio frequency band and monitor for a paging message from a BS (e.g., the BSs 105) in the POW by hopping from at least a first frequency subband of the plurality of frequency subbands to a second frequency subband of the plurality of frequency subbands based on the frequency-hopping pattern.

In some aspects, the paging module 308 is configured to determine the frequency-hopping pattern by determining the frequency-hopping pattern based on a frequency subband offset pattern for a plurality of PDCCH monitoring occasions within the POW and at least one of an initial BWP or an initial BWP hopping pattern. In some aspects, the frequency subband offset pattern includes a frequency subband offset for each PDCCH monitoring occasion in a subset of the plurality of PDCCH monitoring occasions, where the subset of the plurality of PDCCH monitoring occasions is associated with an SSB. In some aspects, the frequency subband offset pattern is predetermined. In some aspects, the initial BWP hopping pattern is at least one of a UE-specific initial BWP hopping pattern or a cell-specific initial BWP hopping pattern, and the frequency subband offset pattern for the plurality of PDCCH monitoring occasions is common for a group of UEs including the UE 300. In some aspects, the initial BWP hopping pattern is based on a UE group ID associated with a group of UEs including the UE 300. In some aspects, the initial BWP hopping pattern is based on a cell-specific initial BWP hopping pattern and a frequency subband offset associated with the UE group ID.

In some aspects, the paging module 308 is configured to receive at least one of the initial BWP or the initial BWP hopping pattern from a BS, for example, via RRC signaling, dedicated UE signaling, and/or SIB signaling.

In some aspects, the paging module 308 is further configured to monitor the paging message by monitoring, during a first PDCCH monitoring occasion of a plurality of PDCCH monitoring occasions associated with paging within the POW, for the paging message in the first frequency subband and monitoring, during a second PDCCH monitoring occasion of the plurality of PDCCH monitoring occasions within the POW, for the paging message in the second frequency subband. In some aspects, the first PDCCH monitoring occasion is associated with a first SSB, and the second PDCCH monitoring occasion is associated with a second SSB. In some aspects, the paging module 308 is further configured to monitor the paging message further by monitoring, during the first PDCCH monitoring occasion, for the paging message in a first beam direction associated with the first SSB and monitoring, during the second PDCCH monitoring occasion, for the paging message in a second beam direction associated with the second SSB.

In some aspects, the paging module 308 is further configured to determine the first frequency subband for a first PDCCH monitoring occasion of the plurality of PDCCH monitoring occasions by adding a first subband offset for the first PDCCH monitoring occasion to a third frequency subband of the plurality of frequency subbands corresponding to the initial BWP. The first PDCCH monitoring occasion may be associated with a first SSB. The paging module 308 may also be configured to determine the second frequency subband for a second PDCCH monitoring occasion of the plurality of PDCCH monitoring occasions by adding a second subband offset for the second PDCCH monitoring occasion to the third frequency subband corresponding to the initial BWP.

In some aspects, the paging module 308 is further configured to terminate paging monitoring early in a POW. For instance, the paging module 308 is configured to refrain from performing additional frequency-hopping upon detecting a paging PDCCH, a paging message, or a paging PDCCH indicating a paging stop indication in a POW.

In some aspects, the paging module 308 is further configured to receive, from the BS, an indication to enable or disable the frequency subband offset pattern, for example, in an SIB such as SIB1, apply the frequency subband offset pattern for paging PDCCH monitoring within the POW based on the instruction.

In some aspects, the paging module 308 is further configured to switch to the initial BWP autonomously based on a UE group ID associated with a group of UEs including the first UE before entering an idle mode. In some aspects, the paging module 308 is further configured to receive an indication of the initial BWP the BS while the UE 300 is in a connected mode and switch to the indicated initial BWP before entering an idle mode, where the initial BWP is based on a UE group ID associated with a group of UEs including the first UE.

In some aspects, the paging module 308 is further configured to perform a cell reselection to a target cell and perform idle mode operations (e.g., including paging PDCCH monitoring) in the target cell according to an initial BWP and/or initial BWP hopping pattern of the target cell. In some aspects, the paging module 308 is further configured to perform a cell reselection to a target cell and perform idle mode operations (e.g., including paging PDCCH monitoring) in the target cell according to a UE group specific initial BWP pattern instead of the initial BWP hopping of the target cell, for example, when the paging module 308 is configured to autonomously switch to a UE-group specific initial BWP before entering an idle mode. Mechanisms for performing idle mode and/or paging operations are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the paging module 308 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 314 may be configured to process (e.g., perform analog to digital conversion or digital to analog conversion, etc.) modulated/encoded data (e.g., PUSCH, PUCCH) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., RRC configuration, PDSCH, PDCCH, SIBs, SSBs, RRC UE dedicated messages, initial BWP hopping pattern, paging frequency-hopping pattern, paging frequency-hopping enable/disable instructions, paging PDCCH, paging message) to the paging module 308 for processing. The antennas 316 may include multiple antennas of similar or different designs in order to sustain multiple transmission links. The RF unit 314 may configure the antennas 316.

In some aspects, the processor 302 is coupled to the memory 304 and configured to determine a frequency-hopping pattern for a POW in a plurality of frequency subbands within a shared radio frequency band and monitor for a paging message from a BS (e.g., the BSs 105) in the POW by hopping from at least a first frequency subband of the plurality of frequency subbands to a second frequency subband of the plurality of frequency subbands based on the frequency-hopping pattern.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
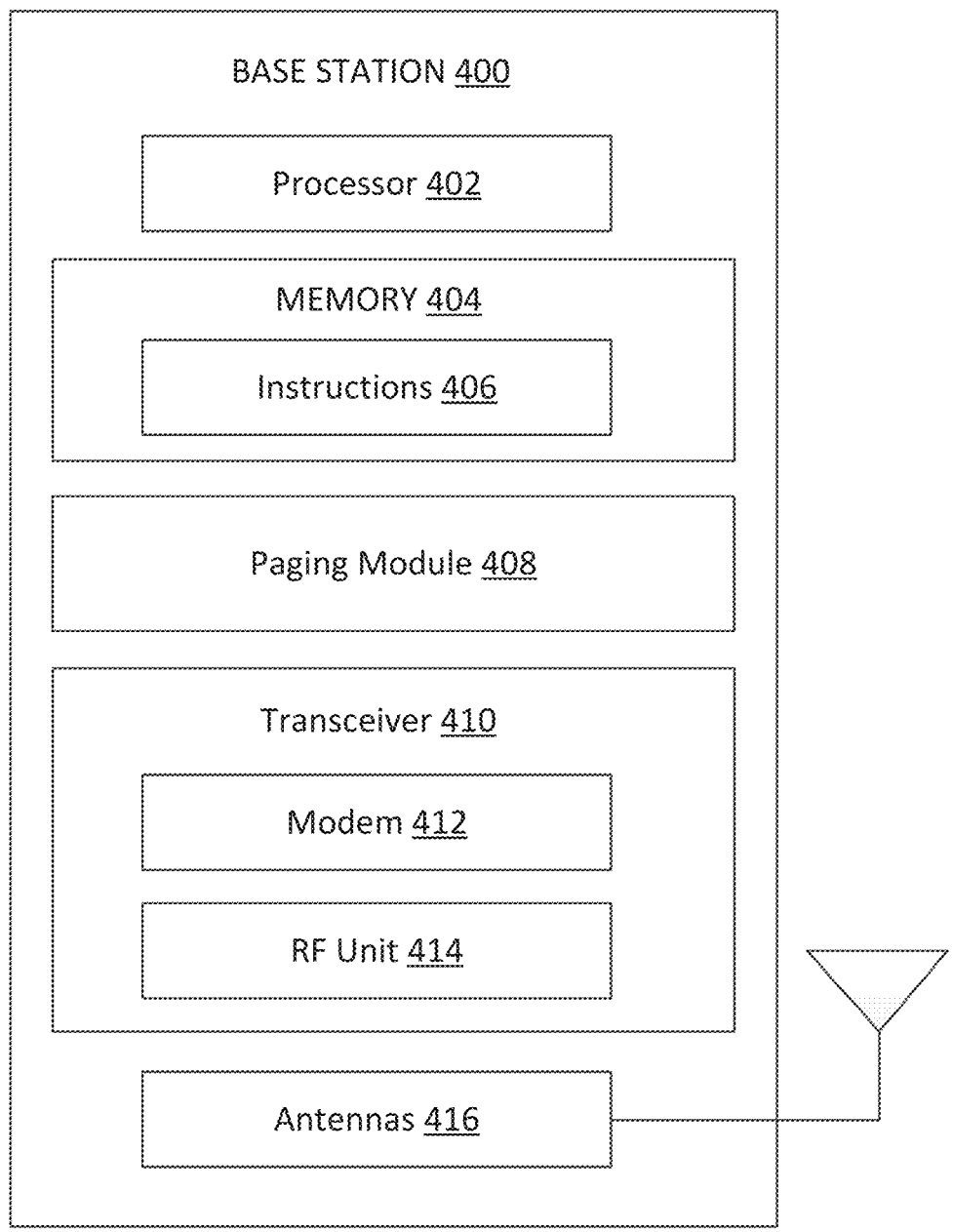
FIG. 4 is a block diagram of an exemplary base station (BS) according to some aspects of the present disclosure.

FIG. 4 is a block diagram of an exemplary BS 400 according to some aspects of the present disclosure. The BS 400 may be a BS 105 in the network 100 as discussed above in FIG. 1. As shown, the BS 400 may include a processor 402, a memory 404, a paging module 408, a transceiver 410 including a modem subsystem 412 and a RF unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2, 5-7 and 9. Instructions 406 may also be referred to as code, which may be interpreted broadly to include any type of computer-readable statement(s) as discussed above with respect to FIG. 3.

The paging module 408 may be implemented via hardware, software, or combinations thereof. For example, the paging module 408 may be implemented as a processor, circuit, and/or instructions 406 stored in the memory 404 and executed by the processor 402. In some instances, the paging module 408 can be integrated within the modem subsystem 412. For example, the paging module 408 can be implemented by a combination of software components (e.g., executed by a DSP or a general processor) and hardware components (e.g., logic gates and circuitry) within the modem subsystem 412.

The paging module 408 may be used for various aspects of the present disclosure, for example, aspects of FIGS. 1-2, 5-7 and 9. For instance, the paging module 408 is configured to determine a frequency-hopping pattern for a POW in a plurality of frequency subbands within a shared radio frequency band and perform paging operations for at least a first UE (e.g., the UEs 115 and/or 300) in the POW by hopping from at least a first frequency subband of the plurality of frequency subbands to a second frequency subband of the plurality of frequency subbands based on the frequency-hopping pattern.

In some aspects, the paging module 408 is configured to determine the frequency-hopping pattern by determining the frequency-hopping pattern based on a frequency subband offset pattern for a plurality of PDCCH monitoring occasions within the POW and at least one of an initial BWP or an initial BWP hopping pattern. In some aspects, the frequency subband offset pattern includes a frequency subband offset for each PDCCH monitoring occasion in a subset of the plurality of PDCCH monitoring occasions, where the subset of the plurality of PDCCH monitoring occasions is associated with an SSB. In some aspects, the frequency subband offset pattern is predetermined. In some aspects, the initial BWP hopping pattern is at least one of a UE-specific initial BWP hopping pattern or a cell-specific initial BWP hopping pattern, and the frequency subband offset pattern for the plurality of PDCCH monitoring occasions is common for a group of UEs including the first UE. In some aspects, the initial BWP hopping pattern is based on a UE group ID associated with a group of UEs including the first UE. In some aspects, the initial BWP hopping pattern is based on a cell-specific initial BWP hopping pattern and a frequency subband offset associated with the UE group ID.

In some aspects, the paging module 408 is configured to transmit at least one of the initial BWP or the initial BWP hopping pattern from a BS, for example, via RRC signaling, dedicated UE signaling, and/or SIB signaling.

In some aspects, the paging module 408 is further configured to perform the paging operations by performing a first LBT in the first frequency subband for a first PDCCH monitoring occasion of a plurality of PDCCH monitoring occasions within the POW and performing a second LBT in the second frequency subband for a second PDCCH monitoring occasion of the plurality of PDCCH monitoring occasions. In some aspects, the first PDCCH monitoring occasion is associated with a first SSB, and the second PDCCH monitoring occasion is associated with a second SSB. In some aspects, the paging module 408 is further configured to perform the paging operations by performing the first LBT for the first PDCCH monitoring occasion in a first beam direction associated with the first SSB and performing the second LBT for the second PDCCH monitoring occasion in a second beam direction associated with the second SSB.

In some aspects, the paging module 408 is further configured to determine the first frequency subband for a first PDCCH monitoring occasion of the plurality of PDCCH monitoring occasions by adding a first subband offset for the first PDCCH monitoring occasion to a third frequency subband of the plurality of frequency subbands corresponding to the initial BWP. The first PDCCH monitoring occasion may be associated with a first SSB. The paging module 308 may also be configured to determine the second frequency subband for a second PDCCH monitoring occasion of the plurality of PDCCH monitoring occasions by adding a second subband offset for the second PDCCH monitoring occasion to the third frequency subband corresponding to the initial BWP.

In some aspects, the paging module 408 is further configured to transmit an indication to enable or disable the frequency subband offset pattern, for example, in an SIB such as SIB1.

In some aspects, the paging module 408 is further configured to offload or distribute idle mode UEs to different frequency subbands in the shared radio frequency band. For instance, the paging module 408 may be configured to a UE with a first initial BWP and a corresponding first initial BWP hopping pattern for the offloading while the UE is in a connected mode, for example, via UE dedicated signaling. In some aspects, the paging module 408 is further configured to determine the first initial BWP and/or the corresponding first initial BWP pattern based on a UE group ID associated with a group of UEs including the connected mode UE. In some instances, the paging module 408 is further configured to determine a new initial BWP hopping pattern for the offloading. In some instances, the paging module 408 is further configured to determine the first initial BWP hopping pattern for the offloading by adding a UE group dependent frequency subband offset to a cell-specific initial BWP hopping pattern. In some instances, the paging module 408 is further configured to broadcast an initial BWP hopping pattern in a SIB and perform paging operations with a group of UEs using a UE group-specific initial BWP hopping pattern different from the initial BWP hopping pattern, where the UE group-specific initial BWP hopping pattern is used to offload idle mode UEs to different frequency subbands. Mechanisms for performing idle mode and/or paging operations are described in greater detail herein.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., RRC configuration, PDSCH, PDCCH, SIBs, SSBs, RRC UE dedicated messages, initial BWP hopping pattern, paging frequency-hopping pattern, paging frequency-hopping enable/disable instructions, paging PDCCH, paging message) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., PUSCH, PUCCH) to the paging module 408 for processing. The antennas 416 may include multiple antennas of similar or different designs in order to sustain multiple transmission links.

In some aspects, the processor 402 is coupled to the memory 404 and configured to coordinate with the paging module 408 to determine a frequency-hopping pattern for a POW in a plurality of frequency subbands within a shared radio frequency band and monitor for a paging message from a BS (e.g., the BSs 105) in the POW by hopping from at least a first frequency subband of the plurality of frequency subbands to a second frequency subband of the plurality of frequency subbands based on the frequency-hopping pattern.

In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
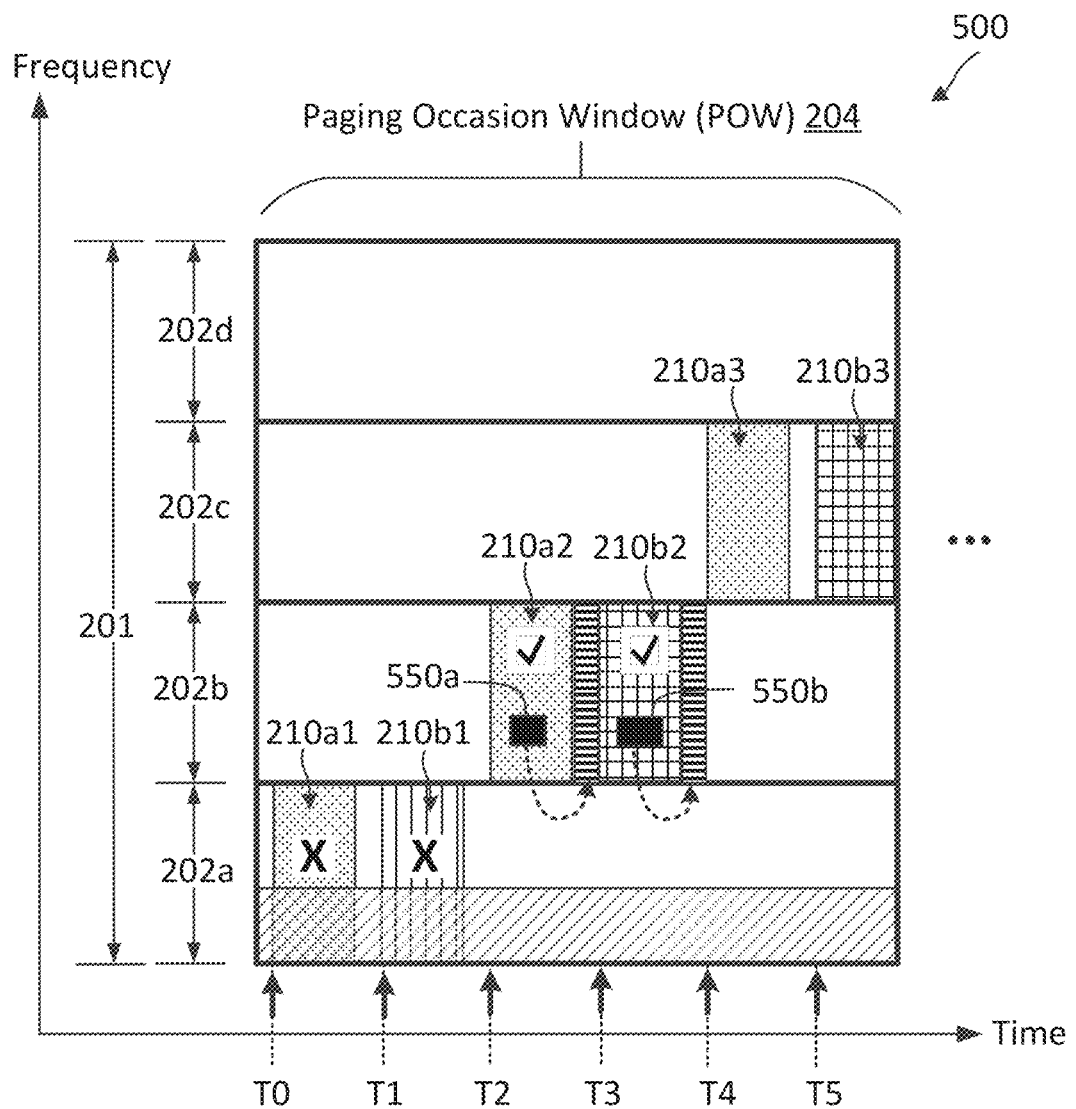
FIG. 5 illustrates a paging scheme with short-term frequency-hopping according to some aspects of the present disclosure.

FIG. 5 illustrates a paging scheme 500 with short-term frequency-hopping according to some aspects of the present disclosure. The scheme 500 may be employed by BSs such as the BSs 105 and 400 and UEs such as the UEs 115 and 300 in a network such as the network 100. In particular, a BS may configure a UE with short-term frequency-hopping for paging as shown in the scheme 500. In FIG. 5, the x-axis represents time in some arbitrary units. The scheme 500 is described using a similar frequency subband configuration as in the scheme 200 and may use the same reference numerals as in FIG. 2 for simplicity's sake.

To improve paging reliability, a BS (e.g., the BSs 105 and/or 400) may configure a UE (e.g., the UEs 115 and/or 300) with short-term frequency-hopping for paging in addition to long-term initial BWP hopping. A short-term frequency hopping may refer to a frequency-hopping where each frequency-hop may have a duration less than a certain time threshold (e.g., about 10 ms). In some aspects, each frequency-hop in a long-term frequency-hopping may have a duration in the order of tens of milliseconds (e.g., about 10 ms, 20 ms, 30 ms, 40 ms or more), whereas each frequency-hop in a short-term frequency-hop may have a duration shorter than about 2 ms (e.g., about 0.5 ms or 1 ms). In some aspects, the short-term frequency-hopping pattern may be in the form of frequency subband offsets for a plurality of PDCCH monitoring occasions 210 within a POW 204, for example, to be added to a current frequency subband 202 where an initial BWP is located. Each frequency subband offset may represent a number of frequency subbands 202 to be added to a current initial BWP for a short-term frequency hop. For instance, a frequency subband offset value of 1 may refer to an addition of one frequency subband 202 to a current initial BWP hop, a frequency subband offset value of 2 may refer to an addition of two frequency subbands 202 to a current initial BWP hop, a frequency subband offset value of 3 may refer to an addition of three frequency subbands 202 to a current initial BWP hop, and so on. Thus, the application of the short-term frequency offset pattern allows the PDCCH monitoring occasions 210 to be located in different frequency subbands 202 within the duration of the POW 204 as will be discussed more fully below.

In some aspects, the BS may configure a short-term subband offset pattern for different PDCCH monitoring occasions 210 associated with a certain SSB. The frequency subband offset pattern may include a set of frequency subband offsets represented by p(i), where i may correspond to the it PDCCH monitoring occasion 210 for a certain SSB (e.g., SSB of index j, where j can be 0, 1, 2, . . . ) within a POW 204. For instance, if the initial BWP is configured in the frequency subband $202_{S(0)}$, a frequency subband offset pattern p(i) having {0, 1, 2} for SSB 0 may correspond to having the PDCCH monitoring occasions 210a1, 210a2, and 210a3 in the frequency subband $202_{S(0)}$, the frequency subband $202_{S(1)}$ (by adding one frequency subband 202 to the initial BWP), and the frequency subband $202_{S(2)}$ (by adding two frequency subbands 202 to the initial BWP), respectively, as shown. Similarly, if the frequency subband offset pattern {0, 1, 2} is applied to the PDCCH monitoring occasions 210b1, 210b2, and 210b3 associated with SSB 1, the PDCCH monitoring occasions 210b1, 210b2, and 210b3 may be located in the frequency subbands $202_{S(0)}$, $202_{S(1)}$, $202_{S(2)}$, respectively, as shown.

As can be observed, while the initial BWP (e.g., the frequency subband $202_{S(0)}$) is impacted by interference 220 that lasted the entire duration of the POW 204, the short-term paging frequency-hopping enables the PDCCH monitoring occasion 210a2 associated with SSB 0 and the PDCCH monitoring occasion 210b2 associated with SSB 1 to be hopped to the frequency subband $202_{S(1)}$, avoiding the interference 220. Thus, at time T2, the BS may pass an LBT in the frequency subband $202_{S(1)}$ for the PDCCH monitoring occasion 210a1 (shown by the checkmark). After passing the LBT, the BS may transmit a paging PDCCH 550a (e.g., with P-RNTI) in the frequency subband $202_{S(1)}$ during the PDDCH monitoring occasion 210a2. The paging PDCCH 550a may indicate a scheduling grant for a paging message 540 in the frequency subband $202_{S(1)}$. The BS may transmit the paging message 540 in the frequency subband $202_{S(1)}$ according to the paging PDCCH 550a. Similarly, at time T3, the BS may pass an LBT in the frequency subband $202_{S(1)}$ for the PDCCH monitoring occasion 210a2 (shown by the checkmark). The BS may transmit a paging PDCCH 550b and a corresponding paging message 540 in the frequency subband $202_{S(1)}$.

In some aspect, SSB 0 may be associated with a first spatial direction or beam direction and SSB 1 may be associated with a second spatial direction different from the first spatial direction as discussed in the scheme 200 with reference to FIG. 2. Thus, the BS may transmit the paging PDCCH 550a in the PDCCH monitoring occasion 210a2 associated with SSB 0 and the corresponding paging message 540 using a transmission beam directed towards the first spatial direction. Similarly, the BS may transmit the paging PDCCH 550b and the corresponding paging message 540 in the PDCCH monitoring occasion 210b2 associated with SSB 1 using a transmission beam directed towards the second spatial direction.

Accordingly, a UE may monitor for a paging PDCCH in the plurality of PDCCH occasions 210 according to the paging frequency subband offset pattern p(i). In other words, the UE may monitor for a paging PDCCH from the BS in the frequency subband $202_{S(0)}$ during the PDCCH monitoring occasion 210a1 (in the spatial direction of SSB 0). The UE may monitor for a paging PDCCH from the BS in the frequency subband $202_{S(0)}$ during the PDCCH monitoring occasion 210b1 (in the spatial direction of SSB 1). The UE may hop to the frequency subband $202_{S(1)}$ and monitor for a paging PDCCH from the BS in the frequency subband $202_{S(1)}$ during the PDCCH monitoring occasion 210a2 (in the spatial direction of SSB 1), and so on.

In some aspects, the UE may stop applying the short-term paging frequency subband offset pattern upon detect a PDCCH scrambled with a P-RNTI, a paging message, and/or a paging PDCCH including a paging stop indication in a frequency subband 202. In other words, the UE may refrain from performing additional short-term paging frequency-hopping upon detecting a PDCCH scrambled with a P-RNTI, a paging message, and/or a paging PDCCH including a paging stop indication. Referring to the example illustrated in FIG. 5, upon detecting the PDCCH 540a scrambled with a P-RNTI, a PDCCH 540b scrambled with a P-RNTI, the paging message 540 associated with the PDCCH 540a, the paging message 540 associated with the PDCCH 540b, a paging stop indication in the PDCCH 540a, or a paging stop indication in the PDCCH 540b, the UE may stop monitoring for a paging message further. For instance, the UE may skip hopping to the frequency subband $202_{S(2)}$ to monitor for paging PDCCH in the PDCCH monitoring occasions 210a3 and 210b3.

In some aspects, the BS may transmit a paging PDCCH and a corresponding paging message once per SSB with all the PDCCH monitoring occasions 210 within a POW 204. In other words, after the BS transmitted the paging PDCCH 550a in the PDCCH monitoring occasion 210a2 and the corresponding paging message 540, the BS may not transmit another paging PDCCH or paging message in a PDCHC monitoring occasion 210 associated with SSB 0 in the POW 204. Similarly, after the BS transmitted the paging PDCCH 550b in the PDCCH monitoring occasion 210b2 and the corresponding paging message 540, the BS may not transmit another paging PDCCH or paging message in a PDCHC monitoring occasion 210 associated with SSB 1 in the POW 204. As shown, the BS may not hop to the frequency subband $202_{S(2)}$ to perform another LBT at time T4 or T5 in the frequency subband $202_{S(2)}$.

In some aspects, the paging frequency subband offset pattern can be a predetermined pattern known to the BS and UEs in the network. In some aspects, the predetermined frequency subband offset pattern can be common among a group of UEs in the same paging occasion or POW 204. For instance, the frequency subband offset pattern can be defined as p(i)=i. In other words, the frequency subband offset can be incremented for each subsequent PDCCH monitoring occasion 210. If the addition of p(i) to the initial BWP exceeds the highest frequency subband 202 in the frequency band 201, a modulo operation of M can be applied to keep the frequency subband hop to be within the frequency band 201, where M represents the number of frequency subbands 202 in the frequency band 201. In the illustrated example of FIG. 5, M is 4. If the initial BWP is configured in the frequency subband $202_{S(0)}$, an it PDCCH monitoring occasion 210 with a frequency subband offset of p(i)=5 may correspond to having the it PDCCH monitoring occasion 210 to be located at the frequency subband $202_{S(1)}$.

In some aspects, the starting frequency position for an initial BWP with a long-term frequency-hopping pattern or sequence, denoted as c(k), can be represented by $N_{BWP,c(k)}^{start}$, where k represents the $k^{th}$ hop and may vary from 0 to K for a sequence of K hops. For instance, the frequency band 201 may be partitioned into a plurality of resource blocks (RBs) in frequency. Each RB may include a plurality of frequency subcarriers, which may be used to carry information data. $N_{BWP,c(0)}^{start}$ may indicate an RB index for the first hop, $N_{BWP,c(1)}^{start}$ indicate an RB index for the second hop, and so on. For instance, a c(k) value of 0, 1, 2, or 3 may correspond to the frequency subbands $202_{S(0)}$, $202_{S(1)}$, $202_{S(2)}$, $202_{S(3)}$, respectively. The dwell time for each hop c(k) may have a duration in the order of tens of ms. In an example, each hop c(k) may have a dwell time of about 10 ms. In some aspects, the BS may configure the long-term frequency-hopping pattern or sequence c(k) via an RRC configuration. For instance, the BS may broadcast a SIB1 indicating the long-term frequency-hopping pattern c(k) for initial BWP hopping.

With the additional paging frequency offset pattern p(i), the starting position for the BWP where an it PDCCH monitoring paging occasion 210 can be represented by $N_{BWP,(c(i)+p(i)mod(M))}^{start}$. The modulo operation of M limits the frequency subband hop to be within the frequency band 201. In some aspects, the BS may configure each UE with a different long-term initial BWP hopping pattern c(k), but may configure all UEs with a common short-term paging frequency-hopping or offset pattern p(i). In other words, the long-term initial BWP hopping pattern c(k) is UE-specific.

The use of the common short-term paging frequency-hopping or offset pattern p(i) can avoid frequency-hopping collision. In addition, the BS may configure the same paging message payload content across the POW 204. In other words, the content of the paging message 540 transmitted by the BS in the PDCCH monitoring occasion 210a2 may be identical to the content of the paging message 540 transmitted by the BS in the PDCCH monitoring occasion 210b2.

In some aspects, the long-term initial BWP hopping pattern c(k) can be cell-specific. For instance, the long-term initial BWP hopping pattern c(k) can be determined based on a physical cell identity of the cell. In some aspects, the long-term initial BWP hopping pattern c(k) can be UE group specific. For instance, a group of UEs (e.g., the UEs 115 and/or 300 can be identified by a UE group ID and the long-term initial BWP hopping pattern c(k) for the group of UEs can be determined based on the UE group ID. In some instances, the UE group ID can be determined by a hash function of a UE ID (e.g., a 5G shortened version of temporary mobile subscriber identify (5G-S-TMSI)). In some aspects, the long-term initial BWP hopping pattern c(k) can be determined by adding a frequency subband offset to a cell-specific long-term initial BWP hopping pattern. In some instances, the frequency subband offset can be determined based on a UE group ID. In some other aspects, different UE groups may be assigned with different long-term initial BWP hopping patterns c(k).

In some aspects, the BS may signal a short-term frequency-hopping pattern or frequency subband offset pattern p(i) for a POW 204 in a SIB1. The BS can indicate an instruction to enable or disable the short-term frequency-hopping pattern for paging. When a UE performs cell re-selection to a new cell, the UE may read SIB1 of the new cell and utilize the short-term frequency-hopping pattern indicated by the SIB1 for frequency subband hopping in a POW 204 as will be discussed more fully below in FIGS. 6 and 7.

While FIG. 5 is illustrated with four frequency subbands 202 and three PDCCH monitoring occasions 210 for each of the two SSBs in the POW 204, the scheme 500 can be alternatively configured to include a greater number (e.g., about 5, 6, 7 or more) or a less number (e.g., about 2 or 3) frequency subbands 202, a greater number (e.g., about 4, 5, 6 more) or a less number (e.g., about 2) of per SSB PDCCH monitoring occasions 210, a great number (e.g., about 3, 4 or more) or a less number (e.g., 1) of SSBs with PDCCH monitoring occasions 210 in the POW 204.

In some aspects, for NR-U light, a BS (e.g., the BSs 105 and/or 400) operating in a wideband (e.g., with a BW of about 80 MHz, 100 MHz, or more) may offload or distribute some idle mode UEs (e.g., the UEs 115 and/or 30)) to different frequency subbands 202. The offloading of idle mode UEs to different frequency subbands 202 may allow the BS to support a greater number of idle mode UEs instead of limited by a single frequency subband 202. Additionally, the offloading of idle mode UEs to different frequency subbands 202 may improve network reliability. As discussed above, if one frequency subband 202 is impacted by interference (e.g., the interference 220), the BS may be able to page idle mode UEs in other frequency subbands 202. If no frequency-hopping is applied to an initial BWP, a UE re-selecting to a new cell may be limited to monitor for a paging message in a frequency subband indicated by a SIB1 broadcasted in the new cell. The initial BWP hopping may allow different paging occasions (e.g., the POW 204) to be in different frequency subbands 202. The additional short-term paging frequency-hopping can further allow different paging PDCCH monitoring occasions of a single paging occasion to be in different frequency subbands 202. Accordingly, the scheme 500 can mitigate subband interference impact on paging and increase paging reliability (e.g., to be comparable to wideband UE paging reliability).

Figure 6:
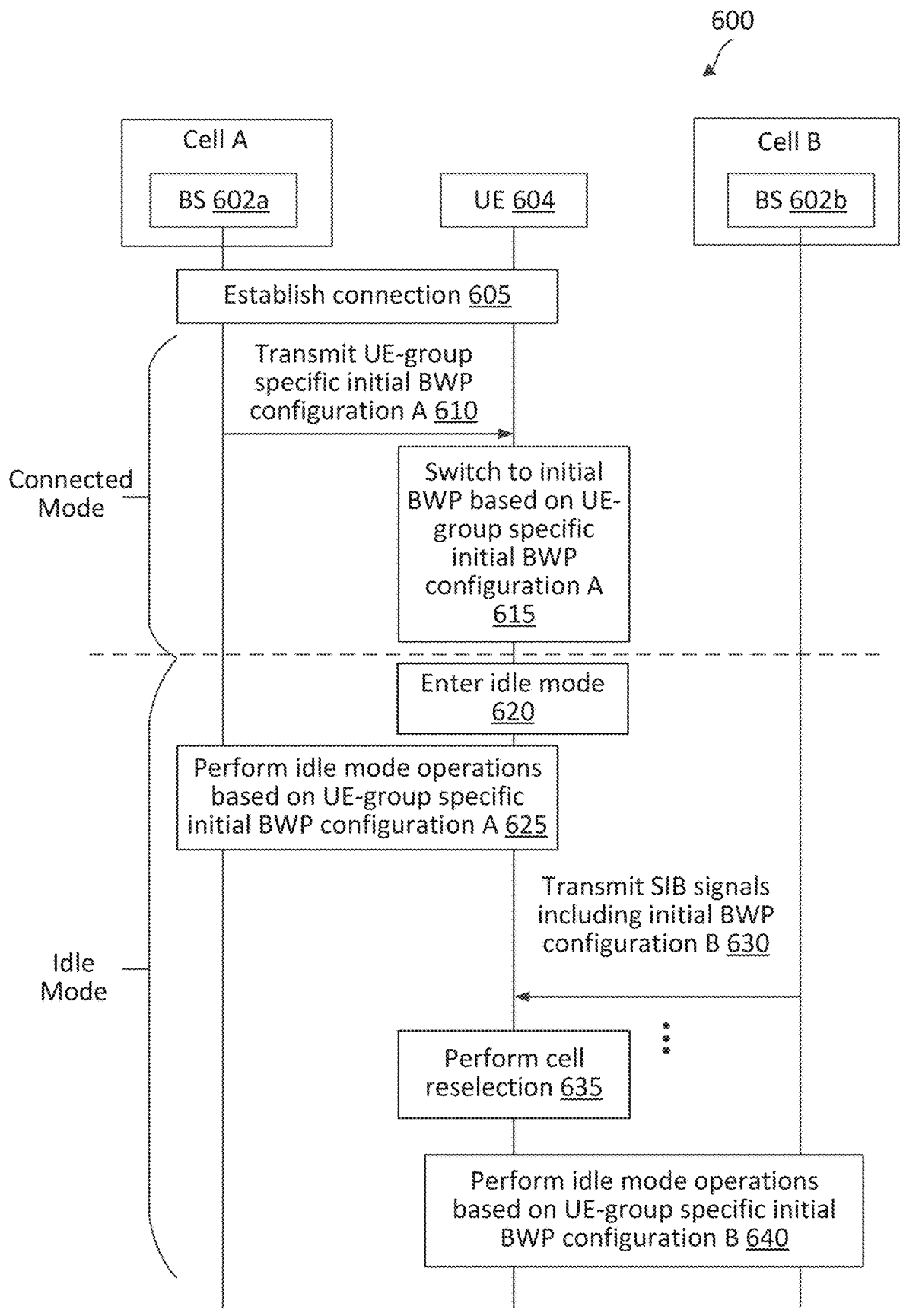
FIG. 6 is a signaling diagram of an idle mode UE offloading method according to some aspects of the present disclosure.

FIG. 6 is a signaling diagram of an idle mode UE offloading method 600 according to some aspects of the present disclosure. The method 600 may be implemented between two BSs 602a and 602b (e.g., BSs 105 and/or 400) and a UE 604 (e.g., UEs 115 and/or 300). The BS 602a may serve a cell A and the BS 602b may serve a cell B. Cell A and Cell B can be neighboring cells. The method 600 may employ similar mechanisms as in the schemes 200 and/or 500 discussed above with respect to FIGS. 2 and 5, respectively. As illustrated, the method 600 includes a number of enumerated steps, but embodiments of the method 600 may include additional steps before, after, and in between the enumerated steps. In some aspects, one or more of the enumerated steps may be omitted or performed in a different order. At a high level, in the method 600, the BS 602a may assign the UE 604 with a new initial BWP with a different hopping pattern based on a UE group ID associated with the UE 604, for example, to offload or distribute idle mode UEs to different frequency subbands (e.g., the frequency subbands 202).

At action 605, the BS 602a of and the UE 604 establishes a connection. The connection may be an RRC connection. The BS 602a and the UE 604 may establish the connection by performing a random access procedure as discussed above with reference to FIG. 1. After completing the connection established, the UE 604 may operate in a connected mode (e.g., an RRC connected mode). Thus, the UE 604 may be referred to as a connected mode UE and may exchange operational user data with the BS 602a. In some instances, the BS 602a may utilize one or more components, such as the processor 402, the paging module 408, the transceiver 410, the modem 412, and/or the one or more antennas 416, to establish the connection. The UE 604 may utilize one or more components, such as the processor 302, the paging module 308, the transceiver 310, the modem 312, and/or the one or more antennas 316, to establish the connection.

At action 610, the BS 602a transmits a UE group-specific initial BWP configuration A. The configuration A may indicate an initial BWP and a corresponding initial BWP hopping pattern (e.g., c(k)). The BS 602a may assign the initial BWP and the corresponding initial BWP hopping pattern to a group of UEs including the UE 604 in the cell A. The BS 602a may assign the group of UEs with a UE group ID. The BS 602a may transmit the initial BWP configuration A via an RRC message. In some instances, the RRC message may be a dedicated UE message destined to the UE 604. The BS may determine the initial BWP hopping pattern based on the UE group ID. In some instances, the BS 602a may determine the initial BWP hopping pattern as a function of the UE group ID. The initial BWP hopping pattern can be used by the UE 604 if the UE 604 determines to enter an idle mode. The initial BWP and/or the corresponding initial BWP hopping pattern may be different than an initial BWP and/or an initial BWP hopping pattern that are currently configured at the UE 604. For instance, the BS 602a may transmit the UE group-specific initial BWP configuration A to offload idle mode UEs to different frequency subbands. In some instances, the BS 602a may utilize one or more components, such as the processor 402, the paging module 408, the transceiver 410, the modem 412, and/or the one or more antennas 416, to transmit the UE group-specific initial BWP configuration A.

At action 615, the UE 604 switches to an initial BWP based on the initial BWP hopping pattern indicated by the UE group-specific initial BWP configuration A. For instance, the UE 604 may determine that the there is no active data to be communicated with the BS 602a and thus may determine to enter an idle mode to save power. In some instances, the UE 604 may utilize one or more components, such as the processor 302, the paging module 308, the transceiver 310, the modem 312, and/or the one or more antennas 316, to switch the initial BWP. The switching to the initial BWP may include switching one or more components (e.g., filters, mixers, and/or clocks) at an RF frontend (e.g., the RF unit 314) of the UE 604 to operate in the initial BWP.

At action 620, after switching to the initial BWP, the UE 604 enters an idle mode (e.g., an RRC idle mode). In some instances, the UE 604 may power down one or more RF components of the UE 604 to save power in the idle mode. The UE 604 may configure a sleep-wake cycle based on a DRX cycle or paging cycle, for example, configured by the BS 602a, so that the UE 604 may wake up (e.g., activate the power down components) to monitor for paging from the BS 602a. In some instances, the UE 604 may utilize one or more components, such as the processor 302, the paging module 308, the transceiver 310, the modem 312, and/or the one or more antennas 316, to enter the idle mode.

At action 625, the BS 602a and the UE 604 may perform idle mode operations based on the UE group-specific initial BWP configuration A. The idle mode operations may include paging, for example, with long-term initial BWP hopping and short-term paging frequency-hopping as discussed in the scheme 500 above with reference to FIG. 5. Additionally, the UE 604a may monitor for reference signals and SSB signals from the current serving cell A and may determine receive signal measurements (e.g., reference signal received power (RSRP) and/or reference signal received quality (RSRQ)) of the current cell A from the received reference signals and/or SSB signals. The UE 604a may determine whether the receive signal measurements of the current serving cell A satisfy a certain threshold. If the UE 604a determines that the receive signal measurements of the current serving cell A fails to satisfy a certain threshold, the UE 604a may start to perform cell search and monitor SSB and/or SIB signals from other cells. In some instances, the BS 602a may utilize one or more components, such as the processor 402, the paging module 408, the transceiver 410, the modem 412, and/or the one or more antennas 416, to perform the idle mode operations. In some instances, the UE 604 may utilize one or more components, such as the processor 302, the paging module 308, the transceiver 310, the modem 312, and/or the one or more antennas 316, to perform the idle mode operations.

The cell B may be a neighboring cell of the cell A. At action 630, the BS 602b may broadcast SIB signals providing system information associated with the cell B. The SIB signals may include an initial BWP configuration B. The configuration B may indicate an initial BWP hopping pattern (e.g., c(k)) for the cell B. The initial BWP hopping pattern may be a cell-specific initial BWP hopping pattern used by cell B. In some aspects, cell A and cell B may have different number of frequency subbands (e.g., the frequency subbands 202) and may have different initial BWP hopping patterns. In some instances, the BS 602b may utilize one or more components, such as the processor 402, the paging module 408, the transceiver 410, the modem 412, and/or the one or more antennas 416, to broadcast the SIB signals.

At action 635, the UE 604 performs cell reselection. For instance, the UE 604 may determine that the receive signal measurements of the current serving cell A falls below a certain threshold (e.g., a cell reselection threshold) and that SIB signals from cell B meets a certain threshold (e.g., a cell selection threshold). Thus, the UE 604 may reselect to the cell B. The cell B may be referred to as a target cell. In some instances, the UE 604 may utilize one or more components, such as the processor 302, the paging module 308, the transceiver 310, the modem 312, and/or the one or more antennas 316, to reselect to the cell B.

At action 640, after reselecting to the cell B, the UE 604 may perform idle mode operations with the BS 602b of the cell B according to the initial BWP configuration B broadcast by the BS 702b. The idle mode operations may include similar paging operations and cell measurements as discussed above at action 625. The UE 604 may perform PDCCH monitoring for paging according to an initial BWP of cell B and/or an initial BWP frequency-hopping pattern of cell B according to the initial BWP configuration B. In some instances, the BS 602b may utilize one or more components, such as the processor 402, the paging module 408, the transceiver 410, the modem 412, and/or the one or more antennas 416, to perform the idle mode operations. In some instances, the UE 604 may utilize one or more components, such as the processor 302, the paging module 308, the transceiver 310, the modem 312, and/or the one or more antennas 316, to perform the idle mode operations.

Figure 7:
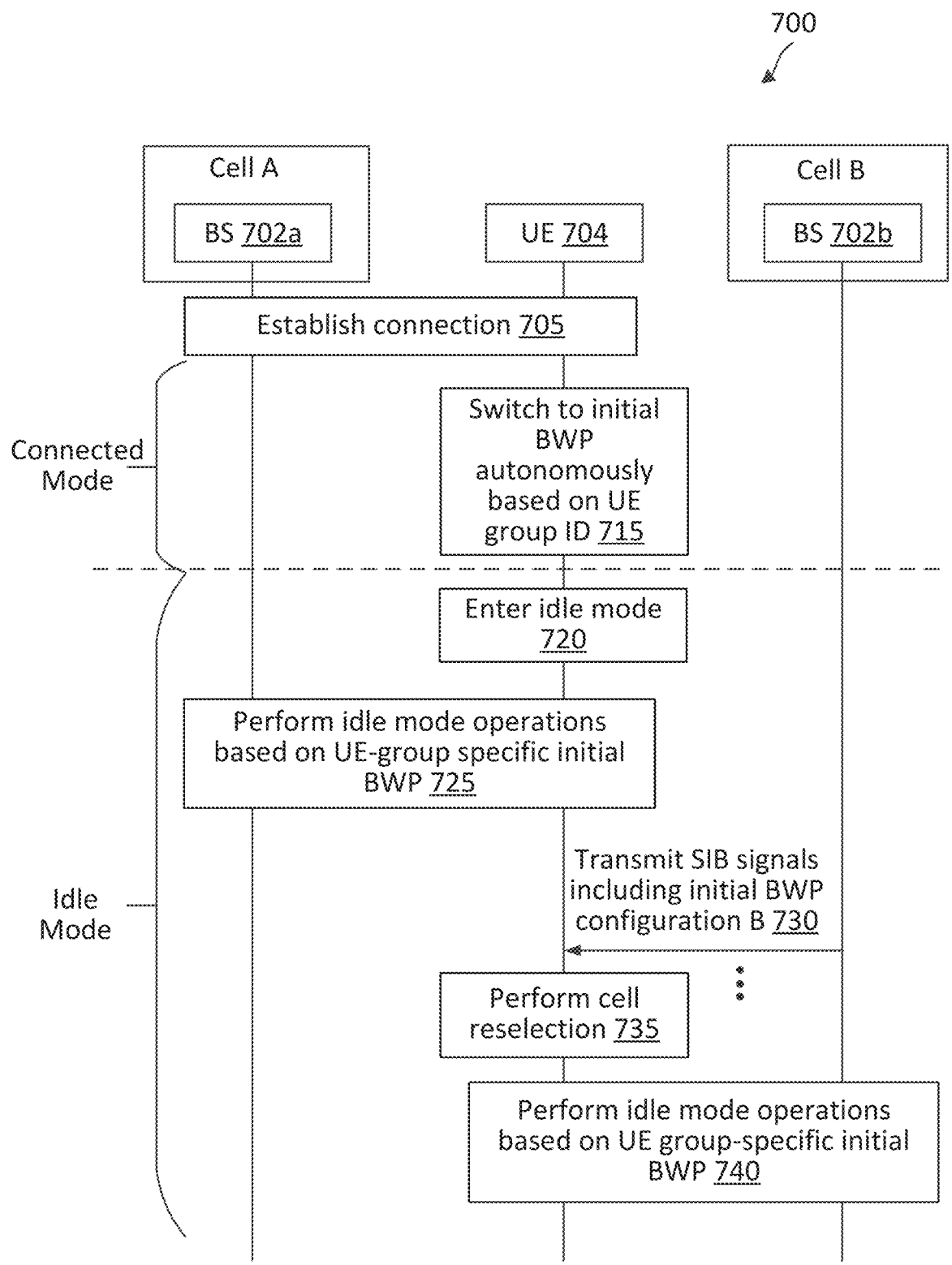
FIG. 7 is a signaling diagram of an idle mode UE offloading method according to some aspects of the present disclosure.

FIG. 7 is a signaling diagram of an idle mode UE offloading method 700 according to some aspects of the present disclosure. The method 700 may be implemented between two BSs 702a and 702b (e.g., BSs 105, 400, and/or 602) and a UE 704 (e.g., UEs 115, 300, and/or 604). The BS 702a may serve a cell A and the BS 702b may serve a cell B. Cell A and Cell B can be neighboring cells. The method 700 may employ similar mechanisms as in the schemes 200 and/or 500 discussed above with respect to FIGS. 2 and 5, respectively, and the method 600 discussed above with respect to FIG. 6. As illustrated, the method 700 includes a number of enumerated steps, but embodiments of the method 700 may include additional steps before, after, and in between the enumerated steps. In some aspects, one or more of the enumerated steps may be omitted or performed in a different order. The method 700 may be substantially similar to the method 600. However, in the method 700, the UE 702 may autonomously switch to a new initial BWP and/or a corresponding initial BWP hopping pattern.

Generally speaking, the method 700 includes features similar to method 600 in many respects. For example, actions 705, 720, 730, and 735 are similar to actions 605, 620, 630, and 635, respectively. Accordingly, for sake of brevity, details of those actions will not be repeated here.

At action 705, the BS 702a of and the UE 704 establishes a connection, for example, by utilizing similar mechanisms as discussed at action 605.

At action 715, the UE 704 switches to an initial BWP with an initial BWP hopping pattern (e.g., c(k)) autonomously. The initial BWP hopping pattern may be specific for a group of UEs including the UE 704. The UE group-specific initial BWP hopping pattern may be known to the BS 702a and the group of UEs including UE 704. In some instances, the UE 704 may determine initial BWP hopping pattern based on a UE group ID. In some instances, the BS 702a may configure the UE 704 to determine the initial BWP and/or the initial BWP hopping pattern based on certain rules. The UE 704 may determine to switch to the initial BWP before transitioning into an idle mode. In some instances, the UE 704 may utilize one or more components, such as the processor 302, the paging module 308, the transceiver 310, the modem 312, and/or the one or more antennas 316, to switch to the initial BWP. In some instances, the UE 704 may configure one or more components (e.g., filters, mixers, and/or clocks) at an RF frontend (e.g., the RF unit 314) of the UE 704 to operate in the initial BWP.

At action 720, after switching to the initial BWP, the UE 704 enters an idle mode, for example, by utilizing similar mechanisms as discussed at action 620.

At action 725, the BS 702a and the UE 704 may perform idle mode operations according to the UE group-specific initial BWP hopping pattern (that the UE 704 autonomously switched to at action 715). The idle mode operations may be substantially similar to the idle mode operations discussed at action 625.

The cell B may be a neighboring cell of the cell A. At action 730, the BS 702b may broadcast SIB signals providing system information associated with the cell B. The SIB signals may include an initial BWP configuration B. The configuration B may indicate an initial BWP hopping pattern (e.g., c(k)) for cell B. The BS 702b may broadcast the SIB signals using substantially similar mechanisms as discussed at action 630.

At action 735, the UE 704 performs cell reselection, for example, for example, by utilizing similar mechanisms as discussed at action 635.

At action 740, after reselecting to the cell B, the UE 704 may perform idle mode operations with the BS 702b of the cell B. The BS 702b may have knowledge of the UE group-specific initial BWP hopping pattern that the UE 704 autonomously switched to at action 715, for example, via coordination with the BS 702a. The UE 704 and the BS 702b may perform the idle mode operations according to the autonomously switched UE group-specific initial BWP hopping pattern. In other words, the UE 704 may disregard or neglect the initial BWP hopping pattern broadcast by the BS 702b in the SIB and utilize the autonomously switched UE group-specific initial BWP hopping pattern in the target cell B. The BS 702b and the UE 704 may perform the idle mode operations by utilizing similar mechanisms as discussed at action 625. For instance, the BS 702b may send the UE 704 a paging message in an initial BWP according to the autonomously switched UE group-specific initial BWP hopping pattern.

Figure 8:
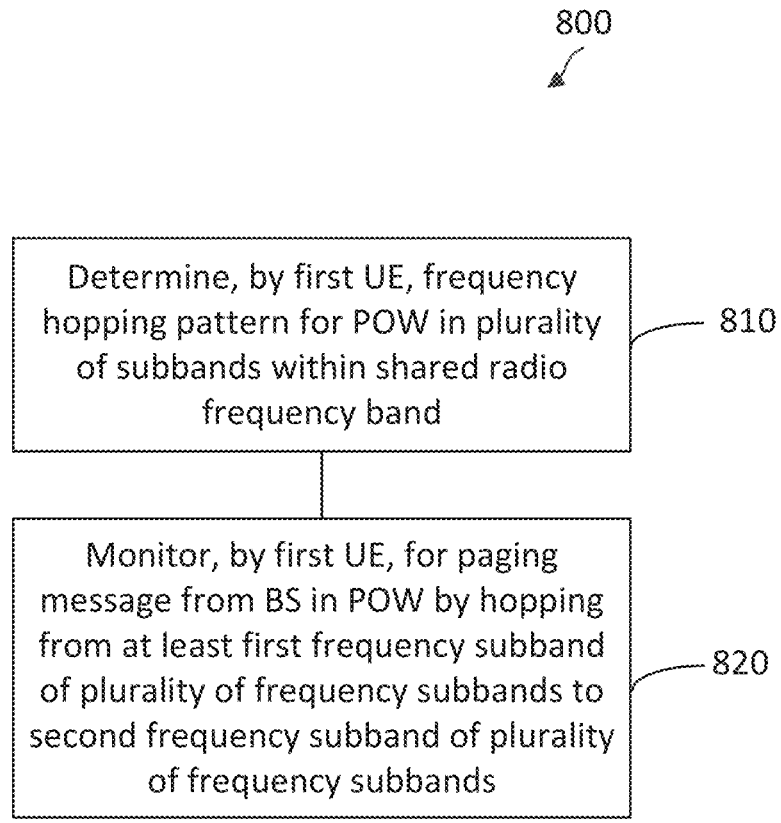
FIG. 8 is a flow diagram of a wireless communication method according to some aspects of the present disclosure.

FIG. 8 is a flow diagram of a wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 300, 604, and/or 704, may utilize one or more components, such as the processor 302, the memory 304, the paging module 308, the transceiver 310, the modem 312, and the one or more antennas 316, to execute the steps of method 800. The method 800 may employ similar mechanisms as in the schemes 200 and/or 500 discussed above with respect to FIGS. 2 and/or 5, respectively, and/or the methods 600 and/or 700 discussed above with respect to FIGS. 6 and/or 7, respectively. As illustrated, the method 800 includes a number of enumerated steps, but aspects of the method 800 may include additional steps before, after, and in between the enumerated steps. In some aspects, one or more of the enumerated steps may be omitted or performed in a different order.

At block 810, a first UE (e.g., the UEs 115, 300, 604, and/or 704) determines a frequency-hopping pattern for a POW (e.g., the POW 204) in a plurality of frequency subbands (e.g., the frequency subbands 202) within a shared radio frequency band (e.g., the shared radio frequency band 201). In some instances, the first UE may utilize one or more components, such as the processor 302, the paging module 308, the transceiver 310, the modem 312, and/or the one or more antennas 316, to determine a frequency-hopping pattern for a POW in a plurality of frequency subbands within a shared radio frequency band.

In some aspects, the determining the frequency-hopping pattern includes determining the frequency-hopping pattern based on a frequency subband offset pattern (e.g., p(i)) for a plurality of PDCCH monitoring occasions (e.g., the PDCCH monitoring occasions 210) within the POW and at least one of an initial BWP or an initial BWP hopping pattern (e.g., c(k)), for example, as shown in the scheme 500 discussed above with reference to FIG. 5. In some aspects, the frequency subband offset pattern includes a frequency subband offset for each PDCCH monitoring occasion in a subset of the plurality of PDCCH monitoring occasions, where the subset of the plurality of PDCCH monitoring occasions is associated with an SSB (e.g., SSB0 or SSB1). In some aspects, the frequency subband offset pattern is predetermined. In some aspects, the initial BWP hopping pattern is at least one of a UE-specific initial BWP hopping pattern for the first UE or a cell-specific initial BWP hopping pattern, and the frequency subband offset pattern for the plurality of PDCCH monitoring occasions is common for a group of UEs including the first UE. In some aspects, the initial BWP hopping pattern is based on a UE group ID associated with a group of UEs including the first UE. In some aspects, the initial BWP hopping pattern is based on a cell-specific initial BWP hopping pattern and a frequency subband offset associated with the UE group ID. In some aspects, the at least one of the initial BWP or the initial BWP hopping pattern is received from a BS (e.g., the BSs 105, 400, 602a, 602b, 702a, and/or 702b), for example, via RRC signaling, dedicated UE signaling, and/or SIB signaling.

At block 820, the first UE monitors for a paging message (e.g., the paging messages 540) from a BS in the POW by hopping from at least a first frequency subband of the plurality of frequency subbands to a second frequency subband of the plurality of frequency subbands based on the frequency-hopping pattern. In some instances, the first UE may utilize one or more components, such as the processor 302, the paging module 308, the transceiver 310, the modem 312, and/or the one or more antennas 316, to monitor for a paging message from a BS in the POW. In some instances, the first UE may hop from the first frequency subband to the second frequency subband by configuring one or more components (e.g., filters, mixers, clocks) at a RF frontend (e.g., the RF unit 314) of the first UE to tune to the second frequency subband.

In some aspects, the monitoring the paging message further includes monitoring, during a first PDCCH monitoring occasion of a plurality of PDCCH monitoring occasions associated with paging within the POW, for the paging message in the first frequency subband. The monitoring the paging message may also include monitoring, during a second PDCCH monitoring occasion of the plurality of PDCCH monitoring occasions within the POW, for the paging message in the second frequency subband. In some aspects, the first PDCCH monitoring occasion is associated with a first SSB. The second PDCCH monitoring occasion is associated with a second SSB. In some aspects, the monitoring the paging message further includes monitoring, during the first PDCCH monitoring occasion, for the paging message in a first beam direction associated with the first SSB. The monitoring the paging message may also include monitoring, during the second PDCCH monitoring occasion, for the paging message in a second beam direction associated with the second SSB.

In some aspects, the first UE may also determine the first frequency subband for a first PDCCH monitoring occasion of the plurality of PDCCH monitoring occasions based on a first subband offset for the first PDCCH monitoring occasion and a third frequency subband of the plurality of frequency subbands. The third frequency subband may correspond to the initial BWP. The first PDCCH monitoring occasion may be associated with a first SSB. The first UE may also determine the second frequency subband for a second PDCCH monitoring occasion of the plurality of PDCCH monitoring occasions based on a second subband offset for the second PDCCH monitoring occasion and the third frequency subband. The second PDCCH monitoring occasion may be associated with a second SSB. In an example, the first UE may determine the first frequency subband by adding the first subband offset to the initial BWP and may determine the second frequency subband by adding the second subband offset to the initial BWP.

In some aspects, the monitoring for the paging message at block 810 further includes switching to the initial BWP autonomously based on a UE group ID associated with a group of UEs including the first UE. For instance, the first UE may configure an RF frontend (e.g., the RF unit 314) to switch to tune to the initial BWP. In some aspects, the monitoring for the paging message at block 810 further includes switching to the initial BWP according to an indication of the initial BWP received from the BS, where the initial BWP is based on a UE group ID associated with a group of UEs including the first UE.

In some aspects, the first UE may also perform a cell reselection to a first cell associated with the BS, for example, as shown in the method 600 discussed above with reference to FIG. 6. The first UE may also receive, from the BS, an SIB an indication of the at least one of the initial BWP or the initial BWP hopping pattern. The monitoring for the paging message at block 820 may also include switching to the initial BWP based on the at least one of the initial BWP or the initial BWP hopping pattern in the received SIB.

In some other aspects, the first UE may also perform a cell reselection to a first cell associated with the BS, for example, as shown in the method 700 discussed above with reference to FIG. 7. The first UE may also receive, from the BS, an SIB an indication of a second initial BWP hopping pattern. The monitoring for the paging message at block 820 may also include refraining from performing frequency hopping based on the second initial BWP hopping pattern (indicated in the received SIB) and monitoring for the paging message based on a UE group-specific initial BWP hopping pattern.

In some aspects, the first UE may also receive, from the BS, an indication to enable or disable the frequency subband offset pattern, for example, in an SIB such as SIB1.

In some aspects, the first UE may refrain from performing additional frequency-hopping in the POW in response to a detection of the paging message in the second frequency subband, a PDCCH associated with paging in the second frequency subband, or a PDCCH including a paging termination indication in the second frequency subband from the monitoring at block 820.

Figure 9:
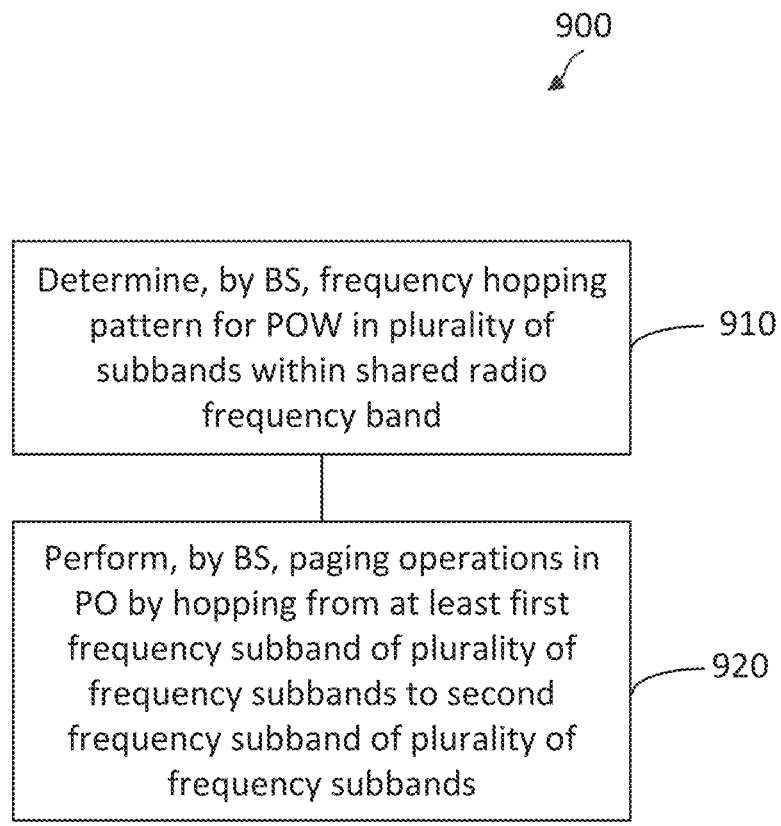
FIG. 9 is a flow diagram of a wireless communication method according to some aspects of the present disclosure.

FIG. 9 is a flow diagram of a wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BSs 105, 400, 602, and/or 702, may utilize one or more components, such as the processor 402, the memory 404, the paging module 408, the transceiver 410, the modem 412, and the one or more antennas 416, to execute the steps of method 900. The method 900 may employ similar mechanisms as in the schemes 200 and/or 500 discussed above with respect to FIGS. 2 and/or 5, respectively, and/or the methods 600 and/or 700 discussed above with respect to FIGS. 6 and/or 7, respectively. As illustrated, the method 900 includes a number of enumerated steps, but aspects of the method 900 may include additional steps before, after, and in between the enumerated steps. In some aspects, one or more of the enumerated steps may be omitted or performed in a different order.

At block 910, the BS determines a frequency-hopping pattern for a POW in a plurality of frequency subbands within a shared radio frequency band.

In some aspects, the determining the frequency-hopping pattern includes determining the frequency-hopping pattern based on a frequency subband offset pattern (e.g., p(i)) for a plurality of PDCCH monitoring occasions (e.g., the PDCCH monitoring occasions 210) within the POW and at least one of an initial BWP or an initial BWP hopping pattern (e.g., c(k)), for example, as shown in the scheme 500 discussed above with reference to FIG. 5. In some aspects, the frequency subband offset pattern includes a frequency subband offset for each PDCCH monitoring occasion in a subset of the plurality of PDCCH monitoring occasions, where the subset of the plurality of PDCCH monitoring occasions is associated with an SSB (e.g., SSB0 or SSB1). In some aspects, the frequency subband offset pattern is predetermined. In some aspects, the initial BWP hopping pattern is at least one of a UE-specific initial BWP hopping pattern for the first UE or a cell-specific initial BWP hopping pattern, and the frequency subband offset pattern for the plurality of PDCCH monitoring occasions is common for a group of UEs including the first UE. In some aspects, the initial BWP hopping pattern is based on a UE group ID associated with a group of UEs including the first UE. In some aspects, the initial BWP hopping pattern is based on a cell-specific initial BWP hopping pattern and a frequency subband offset associated with the UE group ID.

At block 920, the BS performs paging operations in the POW for at least a first user equipment (UE) in the POW by hopping from at least a first frequency subband of the plurality of frequency subbands to a second frequency subband of the plurality of frequency subbands based on the frequency-hopping pattern.

In some aspects, the performing the paging operations further includes performing a first LBT in the first frequency subband for a first PDCCH monitoring occasion of a plurality of PDCCH monitoring occasions within the POW. The performing the paging operations may also include performing a second LBT in the second frequency subband for a second PDCCH monitoring occasion of the plurality of PDCCH monitoring occasions. In some aspects, the first PDCCH monitoring occasion is associated with a first SSB and the second PDCCH monitoring occasion is associated with a second SSB. In some aspects, the performing the paging operations further includes performing, by the BS, the first LBT for the first PDCCH monitoring occasion in a first beam direction associated with the first SSB. The performing the paging operations may also include performing the second LBT for the second PDCCH monitoring occasion in a second beam direction associated with the second SSB. In some aspects, the performing the paging operations may further include transmitting, based on the first LBT, a first paging message in the first frequency subband during the first PDCCH monitoring occasion or transmitting, based on the second LBT, a second paging message in the second frequency subband during the second PDCCH monitoring occasion.

In some aspects, the BS may also determine the first frequency subband for a first PDCCH monitoring occasion of the plurality of PDCCH monitoring occasions based on a first subband offset for the first PDCCH monitoring occasion and a third frequency subband of the plurality of frequency subbands. The third frequency subband may correspond to the initial BWP. The first PDCCH monitoring occasion may be associated with a first SSB. The BS may also determine the second frequency subband for a second PDCCH monitoring occasion of the plurality of PDCCH monitoring occasions based on a second subband offset for the second PDCCH monitoring occasion and the third frequency subband. The second PDCCH monitoring occasion may be associated with a second SSB. In an example, the BS may determine the first frequency subband by adding the first subband offset to the initial BWP and may determine the second frequency subband by adding the second subband offset to the initial BWP.

In some aspects, the BS may also transmit an indication of at least one of the initial BWP or the initial BWP hopping pattern, for example, via RRC signaling, dedicated UE signaling, and/or SIB signaling. In some aspects, the BS may also transmit a SIB including an indication of a second initial BWP hopping pattern. The performing the paging operations BS at block 920 may include refraining from performing frequency hopping based on the second initial BWP hopping pattern (indicated in the transmitted SIB) and performing the paging operations based on a UE group-specific initial BWP hopping pattern (e.g., for offloading idle mode UEs to different frequency subband).

In some aspects, the BS may also transmit an indication to enable or disable the frequency subband offset pattern, for example, in an SIB such as SIB1.

Further aspects of the present disclosure include a method of wireless communication. The method of wireless communication includes determining, by a first user equipment (UE), a frequency hopping pattern for a paging occasion window (POW) in a plurality of frequency subbands within a shared radio frequency band. The method of wireless communication also includes monitoring, by the first UE, for a paging message from a base station (BS) in the POW, where the monitoring includes hopping from at least a first frequency subband of the plurality of frequency subbands to a second frequency subband of the plurality of frequency subbands based on the frequency hopping pattern.

The method may also include one or more of the following features. For instance, the method includes where the monitoring the paging message further includes monitoring, by the first UE during a first physical downlink control channel (PDCCH) monitoring occasion of a plurality of PDCCH monitoring occasions associated with paging within the POW, for the paging message in the first frequency subband; and monitoring, by the first UE during a second PDCCH monitoring occasion of the plurality of PDCCH monitoring occasions within the POW, for the paging message in the second frequency subband. The first PDCCH monitoring occasion is associated with a first synchronization signal block (SSB), and where the second PDCCH monitoring occasion is associated with a second SSB. The monitoring the paging message further includes monitoring, by the first UE during the first PDCCH monitoring occasion, for the paging message in a first beam direction associated with the first SSB; and monitoring, by the first UE during the second PDCCH monitoring occasion, for the paging message in a second beam direction associated with the second SSB. The determining the frequency hopping pattern includes determining, by the first UE, the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associated with a synchronization signal block (SSB), the method may include determining, by the first UE, the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and determining, by the first UE, the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The determining the frequency hopping pattern includes incrementing, by the first UE, a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The method may include receiving, by the first UE from the BS, a configuration including the at least one of the UE-specific initial BWP hopping pattern for the first UE or the cell-specific initial BWP hopping pattern. The initial BWP hopping pattern is based on a UE group Identifier (ID) associated with a group of UEs including the first UE. The initial BWP hopping pattern is based on a cell-specific initial BWP hopping pattern and a frequency subband offset associated with the UE group ID. The monitoring for the paging message further includes switching, by the first UE, to the initial BWP based on a UE group IDentifier (ID) associated with a group of UEs including the first UE. The monitoring for the paging message further includes switching, by the first UE, to the initial BWP based on the received indication. The monitoring for the paging message further includes switching, by the first UE, to the initial BWP based on the at least one of the initial BWP or the initial BWP hopping pattern in the received SIB. The monitoring for the paging message further includes refraining, by the first UE, from performing frequency hopping based on the second initial BWP hopping pattern; and monitoring, by the first UE, for the paging message in the first cell based on a UE group specific initial BWP hopping pattern. The method may include receiving, by the first UE from the BS, an indication to enable or disable the frequency subband offset pattern. The receiving the indication to enable or disable the frequency subband offset pattern in the POW includes receiving, by the first UE from the BS, a system information block (SIB) including the indication to enable or disable the frequency subband offset pattern. The method may include refraining, by the first UE in response to a detection of the paging message in the second frequency subband from the monitoring, from performing additional frequency hopping in the POW. The method may include refraining, by the first UE in response to a detection of a physical downlink control channel (PDCCH) associated with paging in the second frequency subband from the monitoring, from performing additional frequency hopping in the POW. The method may include refraining, by the first UE in response to a detection of a physical downlink control channel (PDCCH) including a paging termination indication in the second frequency subband from the monitoring, from performing additional frequency hopping in the POW.

Further aspects of the present disclosure include a method of wireless communication. The method of wireless communication includes determining, by base station (BS), a frequency hopping pattern for a paging occasion window (POW) in a plurality of frequency subbands within a shared radio frequency band. The method of wireless communication also includes performing, by the BS, paging operations in the POW for at least a first user equipment (UE) in the POW, where the performing the paging operations includes hopping from at least a first frequency subband of the plurality of frequency subbands to a second frequency subband of the plurality of frequency subbands based on the frequency hopping pattern.

The method may also include one or more of the following features. For instance, the method include where the performing the paging operations further includes performing, by the BS, a first listen-before-talk (LBT) in the first frequency subband for a first PDCCH monitoring occasion of a plurality of PDCCH monitoring occasions within the POW; and performing, by the BS, a second LBT in the second frequency subband for a second PDCCH monitoring occasion of the plurality of PDCCH monitoring occasions. The first PDCCH monitoring occasion is associated with a first synchronization signal block (SSB), and where the second PDCCH monitoring occasion is associated with a second SSB. The performing the paging operations further includes performing, by the BS, the first LBT for the first PDCCH monitoring occasion in a first beam direction associated with the first SSB; and performing, by the BS, the second LBT for the second PDCCH monitoring occasion in a second beam direction associated with the second SSB. The performing the paging operations further includes at least one of transmitting, by the BS based on the first LBT, a first paging message in the first frequency subband during the first PDCCH monitoring occasion; or transmitting, by the BS based on the second LBT, a second paging message in the second frequency subband during the second PDCCH monitoring occasion. The determining the frequency hopping pattern includes determining, by the BS, the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associate with a synchronization signal block (SSB), the method may include determining, by the BS, the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and determining, by the BS, the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The determining the frequency hopping pattern includes incrementing, by the BS, a frequency subband offset for each subsequent PDCCH monitoring occasion of the plurality of PDCCH monitoring occasions within the POW.

The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The method may include transmitting, by the BS to the first UE, a configuration including the at least one of the UE-specific initial BWP hopping pattern for the first UE or the UE-specific initial BWP hopping pattern. The initial BWP hopping pattern is based on a UE group IDentifier (ID) associated with a group of UEs. The initial BWP hopping pattern is based on a cell-specific initial BWP hopping pattern and a frequency subband offset associated with the UE group ID. The method may include transmitting, by the BS to the first UE, an indication of the at least one of the initial BWP or the initial BWP hopping pattern via dedicated UE signaling, the at least one of the initial BWP or the initial BWP hopping pattern being based on a UE group IDentifier (ID) associated with a group of UEs including the first UE. The method may include transmitting, by the BS, a system information block (SIB) including an indication of the at least one of the initial BWP or the initial BWP hopping pattern. The performing the paging operations includes refraining, by the BS, from performing frequency hopping based on the second initial BWP hopping pattern; and performing, by the BS, the paging operation based on a UE group specific initial BWP hopping pattern. The method may include transmitting, by the BS, an indication to enable or disable the frequency subband offset pattern. The transmitting the indication to enable or disable the frequency subband offset pattern in the POW includes transmitting, by the BS, a system information block (SIB) including the indication to enable or disable the frequency subband offset pattern.

Further aspects of the present disclosure include a first user equipment (UE) including a processor configured to determine a frequency hopping pattern for a paging occasion window (POW) in a plurality of frequency subbands within a shared radio frequency band; and monitor for a paging message from a base station (BS) in the POW, where the monitor includes hopping from at least a first frequency subband of the plurality of frequency subbands to a second frequency subband of the plurality of frequency subbands based on the frequency hopping pattern.

The first UE may also include one or more of the following features. For instance, the first UE where the processor configured to monitor the paging message is configured to monitor during a first physical downlink control channel (PDCCH) monitoring occasion of a plurality of PDCCH monitoring occasions associated with paging within the POW, for the paging message in the first frequency subband; and monitor during a second PDCCH monitoring occasion of the plurality of PDCCH monitoring occasions within the POW, for the paging message in the second frequency subband. The first PDCCH monitoring occasion is associated with a first synchronization signal block (SSB), and where the second PDCCH monitoring occasion is associated with a second SSB. The processor configured to monitor the paging message is configured to monitor during the first PDCCH monitoring occasion, for the paging message in a first beam direction associated with the first SSB; and monitor during the second PDCCH monitoring occasion, for the paging message in a second beam direction associated with the second SSB. The processor configured to determine the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associated with a synchronization signal block (SSB), and where the processor is further configured to determine the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and determine the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The processor configured to determine the frequency hopping pattern is configured to incrementing a frequency subband offset for each subsequent PDCCH monitoring occasion of the plurality of PDCCH monitoring occasions within the POW.

The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The first UE may include a transceiver configured to receive, from the BS, a configuration including the at least one of the UE-specific initial BWP hopping pattern for the first UE or the cell-specific initial BWP hopping pattern. The initial BWP hopping pattern is based on a UE group IDentifier (ID) associated with a group of UEs including the first UE. The initial BWP hopping pattern is based on a cell-specific initial BWP hopping pattern and a frequency subband offset associated with the UE group ID. The processor configured to monitor for the paging message is configured to switch to the initial BWP based on a UE group IDentifier (ID) associated with a group of UEs including the first UE. The processor configured to monitor for the paging message is configured to switching to the initial BWP based on the received indication. The processor is further configured to perform a cell reselection to a first cell associated with the BS; and receive, from the BS, a system information block (SIB) including an indication of the at least one of the initial BWP or the initial BWP hopping pattern, where the processor configured to monitor for the paging message is configured to switch to the initial BWP based on the at least one of the initial BWP or the initial BWP hopping pattern in the received SIB. The processor is further configured to perform a cell reselection to a first cell associated with the BS; and receive, from the BS, a system information block (SIB) including an indication of a second initial BWP hopping pattern, and where the processor configured to monitor for the paging message is configured to refrain from performing frequency hopping based on the second initial BWP hopping pattern; and monitor for the paging message in the first cell based on a UE group specific initial BWP hopping pattern. The first UE may include a transceiver configured to receive, from the BS, an indication to enable or disable the frequency subband offset pattern. The transceiver configured to receive the indication to enable or disable the frequency subband offset pattern in the POW is configured to receive, from the BS, a system information block (SIB) including the indication to enable or disable the frequency subband offset pattern. The processor is further configured to refrain, in response to a detection of the paging message in the second frequency subband from the monitor, from perform additional frequency hopping in the POW. The processor is further configured to refrain, in response to a detection of a physical downlink control channel (PDCCH) associated with paging in the second frequency subband from the monitor, from perform additional frequency hopping in the POW. The processor is further configured to refrain, in response to a detection of a physical downlink control channel (PDCCH) including a paging termination indication in the second frequency subband from the monitor, from perform additional frequency hopping in the POW.

Further aspects of the present disclosure include a base station (BS) including a processor configured to determine, by base station (BS), a frequency hopping pattern for a paging occasion window (POW) in a plurality of frequency subbands within a shared radio frequency band; and perform paging operations in the POW for at least a first user equipment (UE) in the POW, where the processor configured to perform the paging operations is further configured to hopping from at least a first frequency subband of the plurality of frequency subbands to a second frequency subband of the plurality of frequency subbands based on the frequency hopping pattern.

The BS may also include one or more of the following features. For instance, the BS where the processor configured to perform the paging operations is further configured to perform a first listen-before-talk (LBT) in the first frequency subband for a first PDCCH monitoring occasion of a plurality of PDCCH monitoring occasions within the POW; and perform a second LBT in the second frequency subband for a second PDCCH monitoring occasion of the plurality of PDCCH monitoring occasions. The first PDCCH monitoring occasion is associated with a first synchronization signal block (SSB), and where the second PDCCH monitoring occasion is associated with a second SSB. The processor configured to perform the paging operations is further configured to perform the first LBT for the first PDCCH monitoring occasion in a first beam direction associated with the first SSB; and perform the second LBT for the second PDCCH monitoring occasion in a second beam direction associated with the second SSB. The processor configured to perform the paging operations is further configured to at least one of transmit, based on the first LBT, a first paging message in the first frequency subband during the first PDCCH monitoring occasion; or transmit, based on the second LBT, a second paging message in the second frequency subband during the second PDCCH monitoring occasion. The processor configured to determine the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern.

The frequency subband offset pattern includes a frequency subband offset for each PDCCH monitoring occasion in a subset of the plurality of PDCCH monitoring occasions associate with a synchronization signal block (SSB), and where the processor is further configured to determine the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and determine the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The processor configured to determine the frequency hopping pattern is configured to increment a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The BS may include a transceiver configured to transmit, to the first UE, a configuration including the at least one of the UE-specific initial BWP hopping pattern for the first UE or the UE-specific initial BWP hopping pattern. The initial BWP hopping pattern is based on a UE group Identifier (ID) associated with a group of UEs. The initial BWP hopping pattern is based on a cell-specific initial BWP hopping pattern and a frequency subband offset associated with the UE group ID. The BS may include a transceiver configured to transmit, to the first UE, an indication of the at least one of the initial BWP or the initial BWP hopping pattern via dedicated UE signaling, the at least one of the initial BWP or the initial BWP hopping pattern being based on a UE group IDentifier (ID) associated with a group of UEs including the first UE. The BS may include a transceiver configured to transmit a system information block (SIB) including an indication of the at least one of the initial BWP or the initial BWP hopping pattern. The processor configured to perform the paging operations is configured to refrain from performing frequency hopping based on the second initial BWP hopping pattern; and perform the paging operation based on a UE group specific initial BWP hopping pattern. The BS may include a transceiver configured to transmit an indication to enable or disable the frequency subband offset pattern. The transceiver configured to transmit the indication to enable or disable the frequency subband offset pattern in the POW is configured to transmit a system information block (SIB) including the indication to enable or disable the frequency subband offset pattern.

Further aspects of the present disclosure include a non-transitory computer-readable medium having program code recorded thereon. The non-transitory computer-readable medium also includes code for causing a first user equipment (UE) to determine a frequency hopping pattern for a paging occasion window (POW) in a plurality of frequency subbands within a shared radio frequency band. The non-transitory computer-readable medium also includes code for causing the first UE to monitor for a paging message from a base station (BS) in the POW, where the code for causing the first UE to monitor for the paging message is configured to hop from at least a first frequency subband of the plurality of frequency subbands to a second frequency subband of the plurality of frequency subbands based on the frequency hopping pattern.

The non-transitory computer-readable medium may also include one or more of the following features. For instance, the non-transitory computer-readable medium where the code for causing the first UE to monitor the paging message is configured to monitor during a first physical downlink control channel (PDCCH) monitor occasion of a plurality of PDCCH monitoring occasions associated with paging within the POW, for the paging message in the first frequency subband; and monitor during a second PDCCH monitoring occasion of the plurality of PDCCH monitoring occasions within the POW, for the paging message in the second frequency subband. The first PDCCH monitoring occasion is associated with a first synchronization signal block (SSB), and where the second PDCCH monitoring occasion is associated with a second SSB. The code for causing the first UE to monitor the paging message is configured to monitor during the first PDCCH monitoring occasion, for the paging message in a first beam direction associated with the first SSB; and monitor during the second PDCCH monitoring occasion, for the paging message in a second beam direction associated with the second SSB. The code for causing the first UE to determine the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern.

The frequency subband offset pattern includes a frequency subband offset for each PDCCH monitoring occasion in a subset of the plurality of PDCCH monitoring occasions associated with a synchronization signal block (SSB), and where the program code further includes code for causing the first UE to determine the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and code for causing the first UE to determine the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB.

The frequency subband offset pattern for the plurality of PDCCH monitoring occasions is predetermined. The code for causing the first UE to determine the frequency hopping pattern is configured to incrementing a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The non-transitory computer-readable medium may include code for causing the first UE to receive, from the BS, a configuration including the at least one of the UE-specific initial BWP hopping pattern for the first UE or the cell-specific initial BWP hopping pattern. The initial BWP hopping pattern is based on a UE group IDentifier (ID) associated with a group of UEs including the first UE. The initial BWP hopping pattern is based on a cell-specific initial BWP hopping pattern and a frequency subband offset associated with the UE group ID. The code for causing the first UE to monitor for the paging message is configured to switch to the initial BWP based on a UE group IDentifier (ID) associated with a group of UEs including the first UE. The code for causing the first UE to monitor for the paging message is configured to switch to the initial BWP based on the received indication. The code for causing the first UE to monitor for the paging message is configured to switch to the initial BWP based on the at least one of the initial BWP or the initial BWP hopping pattern in the received SIB. The code for causing the first UE to monitor for the paging message is configured to refrain from performing frequency hopping based on the second initial BWP hopping pattern; and monitor for the paging message in the first cell based on a UE group specific initial BWP hopping pattern. The non-transitory computer-readable medium may include code for causing the first UE to receive, from the BS, an indication to enable or disable the frequency subband offset pattern. The code for causing the first UE to receive the indication to enable or disable the frequency subband offset pattern in the POW is configured to receive, from the BS, a system information block (SIB) including the indication to enable or disable the frequency subband offset pattern. The non-transitory computer-readable medium may include code for causing the first UE to refrain, in response to a detection of the paging message in the second frequency subband from the monitor, from perform additional frequency hopping in the POW. The non-transitory computer-readable medium may include code for causing the first UE to refrain, in response to a detection of a physical downlink control channel (PDCCH) associated with paging in the second frequency subband from the monitor, from perform additional frequency hopping in the POW. The non-transitory computer-readable medium may include code for causing the first UE to refrain, in response to a detection of a physical downlink control channel (PDCCH) including a paging termination indication in the second frequency subband from the monitor, from perform additional frequency hopping in the POW.

Further aspects of the present disclosure include a non-transitory computer-readable medium having program code recorded thereon. The non-transitory computer-readable medium also includes code for causing a base station (BS) to determine, by base station (BS), a frequency hopping pattern for a paging occasion window (POW) in a plurality of frequency subbands within a shared radio frequency band. The non-transitory computer-readable medium also includes code for causing the BS to perform paging operations in the POW for at least a first user equipment (UE) in the POW, where the code for causing the BS to perform the paging operations is configured to hop from at least a first frequency subband of the plurality of frequency subbands to a second frequency subband of the plurality of frequency subbands based on the frequency hopping pattern.

The non-transitory computer-readable medium may also include one or more of the following features. For instance, the non-transitory computer-readable medium where the code for causing the BS to perform the paging operations is further configured to perform a first listen-before-talk (LBT) in the first frequency subband for a first PDCCH monitoring occasion of a plurality of PDCCH monitoring occasions within the POW; and perform a second LBT in the second frequency subband for a second PDCCH monitoring occasion of the plurality of PDCCH monitoring occasions. The first PDCCH monitoring occasion is associated with a first synchronization signal block (SSB), and where the second PDCCH monitoring occasion is associated with a second SSB. The code for causing the BS to perform the paging operations is further configured to perform the first LBT for the first PDCCH monitoring occasion in a first beam direction associated with the first SSB; and perform the second LBT for the second PDCCH monitoring occasion in a second beam direction associated with the second SSB. The code for causing the BS to perform the paging operations is further configured to at least one of transmit, based on the first LBT, a first paging message in the first frequency subband during the first PDCCH monitoring occasion; or transmit, based on the second LBT, a second paging message in the second frequency subband during the second PDCCH monitoring occasion. The code for causing the BS to determine the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associate with a synchronization signal block (SSB), and where the program code further includes code for causing the BS to determine the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and code for causing the BS to determine the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The code for causing the BS to determine the frequency hopping pattern is configured to increment a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The non-transitory computer-readable medium may include code for causing the BS to transmit, to the first UE, a configuration including the at least one of the UE-specific initial BWP hopping pattern for the first UE or the UE-specific initial BWP hopping pattern. The initial BWP hopping pattern is based on a UE group IDentifier (ID) associated with a group of UEs. The initial BWP hopping pattern is based on a cell-specific initial BWP hopping pattern and a frequency subband offset associated with the UE group ID. The non-transitory computer-readable medium may include code for causing the BS to transmit, to the first UE, an indication of the at least one of the initial BWP or the initial BWP hopping pattern via dedicated UE signaling, the at least one of the initial BWP or the initial BWP hopping pattern being based on a UE group IDentifier (ID) associated with a group of UEs including the first UE. The non-transitory computer-readable medium may include code for causing the BS to transmit a system information block (SIB) including an indication of the at least one of the initial BWP or the initial BWP hopping pattern. The code for causing the BS to perform the paging operations is configured to refrain from performing frequency hopping based on the second initial BWP hopping pattern; and perform the paging operations based on a UE group specific initial BWP hopping pattern. where the at least one of the initial BWP or the initial BWP hopping pattern is based on a UE group IDentifier (ID). The non-transitory computer-readable medium may include code for causing the BS to transmit an indication to enable or disable the frequency subband offset pattern. The code for causing the BS to transmit the indication to enable or disable the frequency subband offset pattern in the POW is configured to transmit a system information block (SIB) including the indication to enable or disable the frequency subband offset pattern.

Further aspects of the present disclosure include a first user equipment (UE) including means for determining a frequency hopping pattern for a paging occasion window (POW) in a plurality of frequency subbands within a shared radio frequency band. The first user equipment also includes means for monitoring for a paging message from a base station (BS) in the POW, where the means for monitoring for the paging message is configured to hop from at least a first frequency subband of the plurality of frequency subbands to a second frequency subband of the plurality of frequency subbands based on the frequency hopping pattern.

The first UE may also include one or more of the following features. For instance, the first UE where the means for monitoring the paging message is configured to monitor during a first physical downlink control channel (PDCCH) monitor occasion of a plurality of PDCCH monitoring occasions associated with paging within the POW, for the paging message in the first frequency subband; and monitor during a second PDCCH monitoring occasion of the plurality of PDCCH monitoring occasions within the POW, for the paging message in the second frequency subband. The first PDCCH monitoring occasion is associated with a first synchronization signal block (SSB), and where the second PDCCH monitoring occasion is associated with a second SSB. The means for monitoring the paging message is configured to monitor during the first PDCCH monitoring occasion, for the paging message in a first beam direction associated with the first SSB; and monitor during the second PDCCH monitoring occasion, for the paging message in a second beam direction associated with the second SSB. The means for determining the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associated with a synchronization signal block (SSB), the first UE may include means for determining the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and means for determining the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The means for determining the frequency hopping pattern is configured to increment a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The first UE may include means for receiving, from the BS, a configuration including the at least one of the UE-specific initial BWP hopping pattern for the first UE or the cell-specific initial BWP hopping pattern. The initial BWP hopping pattern is based on a UE group IDentifier (ID) associated with a group of UEs including the first UE. The initial BWP hopping pattern is based on a cell-specific initial BWP hopping pattern and a frequency subband offset associated with the UE group ID. The means for monitoring for the paging message is configured to switch to the initial BWP based on a UE group IDentifier (ID) associated with a group of UEs including the first UE. The means for monitoring for the paging message is configured to switch to the initial BWP based on the received indication. The means for monitoring for the paging message is configured to switch to the initial BWP based on the at least one of the initial BWP or the initial BWP hopping pattern in the received SIB. The means for monitoring for the paging message is configured to refrain from performing frequency hopping based on the second initial BWP hopping pattern; and monitor for the paging message in the first cell based on a UE group specific initial BWP hopping pattern. The first UE may include means for receiving, from the BS, an indication to enable or disable the frequency subband offset pattern. The means for receiving the indication to enable or disable the frequency subband offset pattern in the POW is configured to receive, from the BS, a system information block (SIB) including the indication to enable or disable the frequency subband offset pattern. The first UE may include means for refraining, in response to a detection of the paging message in the second frequency subband from the monitor, from perform additional frequency hopping in the POW. The first UE may include means for refraining, in response to a detection of a physical downlink control channel (PDCCH) associated with paging in the second frequency subband from the monitor, from perform additional frequency hopping in the POW. The first UE may include means for refraining, in response to a detection of a physical downlink control channel (PDCCH) including a paging termination indication in the second frequency subband from the monitor, from perform additional frequency hopping in the POW.

Further aspects of the present disclosure include a base station (BS) including means for determining, by base station (BS), a frequency hopping pattern for a paging occasion window (POW) in a plurality of frequency subbands within a shared radio frequency band. The base station also includes means for performing paging operations in the POW for at least a first user equipment (UE) in the POW, where the means for performing the paging operations is configured to hop from at least a first frequency subband of the plurality of frequency subbands to a second frequency subband of the plurality of frequency subbands based on the frequency hopping pattern.

The BS may also include one or more of the following features. For instance, the BS where the means for performing the paging operations is further configured to perform a first listen-before-talk (LBT) in the first frequency subband for a first PDCCH monitoring occasion of a plurality of PDCCH monitoring occasions within the POW; and perform a second LBT in the second frequency subband for a second PDCCH monitoring occasion of the plurality of PDCCH monitoring occasions. The first PDCCH monitoring occasion is associated with a first synchronization signal block (SSB), and where the second PDCCH monitoring occasion is associated with a second SSB. The means for performing the paging operations is further configured to perform the first LBT for the first PDCCH monitoring occasion in a first beam direction associated with the first SSB; and perform the second LBT for the second PDCCH monitoring occasion in a second beam direction associated with the second SSB. The means for performing the paging operations is further configured to at least one of transmit, based on the first LBT, a first paging message in the first frequency subband during the first PDCCH monitoring occasion; or transmit, based on the second LBT, a second paging message in the second frequency subband during the second PDCCH monitoring occasion. The means for determining the frequency hopping pattern is configured to determine the frequency hopping pattern based on a frequency subband offset pattern for a plurality of PDCCH monitoring occasions within the POW and at least one of an initial bandwidth part (BWP) or an initial BWP hopping pattern. The frequency subband offset pattern includes a frequency subband offset for each PDCCH monitoring occasion in a subset of the plurality of PDCCH monitoring occasions associate with a synchronization signal block (SSB), and BS may include means for determining the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and means for determining the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB. The frequency subband offset pattern for the plurality of PDCCH monitoring occasions is predetermined. The means for determining the frequency hopping pattern is configured to increment a frequency subband offset for each subsequent PDCCH monitoring occasion of the plurality of PDCCH monitoring occasions within the POW. The initial BWP hopping pattern is at least one of a UE-specific initial BWP hopping pattern for the first UE or a cell-specific initial BWP hopping pattern, and where the frequency subband offset pattern for the plurality of PDCCH monitoring occasions is common for a group of UEs including the first UE. The BS may include means for transmitting, to the first UE, a configuration including the at least one of the UE-specific initial BWP hopping pattern for the first UE or the UE-specific initial BWP hopping pattern. The initial BWP hopping pattern is based on a UE group IDentifier (ID) associated with a group of UEs. The initial BWP hopping pattern is based on a cell-specific initial BWP hopping pattern and a frequency subband offset associated with the UE group ID. The BS may include means for transmitting, to the first UE, an indication of the at least one of the initial BWP or the initial BWP hopping pattern via dedicated UE signaling, the at least one of the initial BWP or the initial BWP hopping pattern being based on a UE group IDentifier (ID) associated with a group of UEs including the first UE. The BS may include means for transmitting a system information block (SIB) including an indication of the at least one of the initial BWP or the initial BWP hopping pattern. The means for performing the paging operations is configured to refrain from performing frequency hopping based on the second initial BWP hopping pattern; and perform the paging operations based on a UE group specific initial BWP hopping pattern. The BS may include means for transmitting an indication to enable or disable the frequency subband offset pattern. The means for transmitting the indication to enable or disable the frequency subband offset pattern in the POW is configured to transmit a system information block (SIB) including the indication to enable or disable the frequency subband offset pattern.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    determining, by a first user equipment (UE) based on a frequency subband offset pattern, a frequency hopping pattern for a paging occasion window (POW) in a plurality of frequency subbands within a shared radio frequency band; and
    monitoring, by the first UE, for a paging message from a network unit in the POW, wherein the monitoring comprises hopping from at least a first frequency subband of the plurality of frequency subbands to a second frequency subband of the plurality of frequency subbands based on the frequency hopping pattern;
    wherein the determining the frequency hopping pattern comprises:
        determining, by the first UE, the frequency hopping pattern based on the frequency subband offset pattern for a plurality of PDCCH monitoring occasions within the POW and at least one of an initial bandwidth part (BWP) or an initial BWP hopping pattern.

2. The method of claim 1, wherein the monitoring the paging message further comprises:
    monitoring, by the first UE during a first physical downlink control channel (PDCCH) monitoring occasion of a plurality of PDCCH monitoring occasions associated with paging within the POW, for the paging message in the first frequency subband; and
    monitoring, by the first UE during a second PDCCH monitoring occasion of the plurality of PDCCH monitoring occasions within the POW, for the paging message in the second frequency subband.

3. The method of claim 2, wherein the first PDCCH monitoring occasion is associated with a first synchronization signal block (SSB), and wherein the second PDCCH monitoring occasion is associated with a second SSB.

4. The method of claim 3, wherein the monitoring the paging message further comprises:
    monitoring, by the first UE during the first PDCCH monitoring occasion, for the paging message in a first beam direction associated with the first SSB; and
    monitoring, by the first UE during the second PDCCH monitoring occasion, for the paging message in a second beam direction associated with the second SSB.

5. The method of claim 1, wherein the frequency subband offset pattern comprises a frequency subband offset for each PDCCH monitoring occasion in a subset of the plurality of PDCCH monitoring occasions associated with a synchronization signal block (SSB), the method further comprising:
    determining, by the first UE, the first frequency subband for a first PDCCH monitoring occasion of the plurality of PDCCH monitoring occasions based on a first subband offset for the first PDCCH monitoring occasion and a third frequency subband of the plurality of frequency subbands, the third frequency subband corresponding to the initial BWP, the first PDCCH monitoring occasion associated with a first SSB; and determining, by the first UE, the second frequency subband for a second PDCCH monitoring occasion of the plurality of PDCCH monitoring occasions based on a second subband offset for the second PDCCH monitoring occasion and the third frequency subband, the second PDCCH monitoring occasion associated with a second SSB.

6. The method of claim 1, wherein the frequency subband offset pattern for the plurality of PDCCH monitoring occasions is predetermined.

7. The method of claim 1, wherein the determining the frequency hopping pattern comprises: incrementing, by the first UE, a frequency subband offset for each subsequent PDCCH monitoring occasion of the plurality of PDCCH monitoring occasions within the POW.

8. The method of claim 1, wherein the initial BWP hopping pattern is at least one of a UE-specific initial BWP hopping pattern for the first UE or a cell-specific initial BWP hopping pattern, and wherein the frequency subband offset pattern for the plurality of PDCCH monitoring occasions is common for a group of UEs including the first UE.

9. The method of claim 8, further comprising:
receiving, by the first UE from the network unit, a configuration including the at least one of the UE-specific initial BWP hopping pattern for the first UE or the cell-specific initial BWP hopping pattern.

10. The method of claim 1, wherein the initial BWP hopping pattern is based on a UE group identifier (ID) associated with a group of UEs including the first UE.

11. The method of claim 10, wherein the initial BWP hopping pattern is based on a cell-specific initial BWP hopping pattern and a frequency subband offset associated with the UE group ID.

12. The method of claim 1, wherein the monitoring for the paging message further comprises: switching, by the first UE, to the initial BWP based on a UE group identifier (ID) associated with a group of UEs including the first UE.

13. The method of claim 1, further comprising: receiving, by the first UE, an indication of the initial BWP via dedicated UE signaling, the initial BWP associated with the initial BWP hopping pattern, and the initial BWP hopping pattern based on a UE group identifier (ID) associated with a group of UEs including the first UE, wherein the monitoring for the paging message further comprises: switching, by the first UE, to the initial BWP based on the received indication.

14. The method of claim 1, further comprising: performing, by the first UE, a cell reselection to a first cell associated with the network unit; and receiving, by the first UE from the network unit, a system information block (SIB) including an indication of the at least one of the initial BWP or the initial BWP hopping pattern, wherein the monitoring for the paging message further comprises: switching, by the first UE, to the initial BWP based on the at least one of the initial BWP or the initial BWP hopping pattern in the received SIB.

15. The method of claim 1, further comprising: performing, by the first UE, a cell reselection to a first cell associated with the network unit; receiving, by the first UE from the network unit, a system information block (SIB) including an indication of a second initial BWP hopping pattern, wherein the monitoring for the paging message further comprises: refraining, by the first UE, from performing frequency hopping based on the second initial BWP hopping pattern; and monitoring, by the first UE, for the paging message in the first cell based on a UE group specific initial BWP hopping pattern.

16. A method of wireless communication, comprising:
determining, by a first user equipment (UE) based on a frequency subband offset pattern, a frequency hopping pattern for a paging occasion window (POW) in a plurality of frequency subbands within a shared radio frequency band;
monitoring, by the first UE, for a paging message from a network unit in the POW, wherein the monitoring comprises hopping from at least a first frequency subband of the plurality of frequency subbands to a second frequency subband of the plurality of frequency subbands based on the frequency hopping pattern; and
receiving, by the first UE from the network unit, an indication to enable or disable the frequency subband offset pattern.

17. The method of claim 16, wherein the receiving the indication to enable or disable the frequency subband offset pattern in the POW comprises:
receiving, by the first UE from the network unit, a system information block (SIB) including the indication to enable or disable the frequency subband offset pattern.

18. The method of claim 1, further comprising:
refraining, by the first UE in response to a detection of the paging message in the second frequency subband from the monitoring, from performing additional frequency hopping in the POW.

19. The method of claim 1, further comprising:
refraining, by the first UE in response to a detection of a physical downlink control channel (PDCCH) associated with paging in the second frequency subband from the monitoring, from performing additional frequency hopping in the POW.

20. The method of claim 1, further comprising:
refraining, by the first UE in response to a detection of a physical downlink control channel (PDCCH) including a paging termination indication in the second frequency subband from the monitoring, from performing additional frequency hopping in the POW.

21. A first user equipment (UE) comprising:
a memory;
a transceiver; and
at least one processor coupled to the memory and the transceiver, wherein the first UE is configured to:
determine, based on a frequency subband offset pattern, a frequency hopping pattern for a paging occasion window (POW) in a plurality of frequency subbands within a shared radio frequency band; and
monitor for a paging message from a network unit in the POW, wherein the monitor comprises hopping from at least a first frequency subband of the plurality of frequency subbands to a second frequency subband of the plurality of frequency subbands based on the frequency hopping pattern,
wherein the first UE is further configured to:
determine the frequency hopping pattern based on the frequency subband offset pattern for a plurality of PDCCH monitoring occasions within the POW and at least one of an initial bandwidth part (BWP) or an initial BWP hopping pattern.

22. The first UE of claim 21, wherein the first UE is further configured to:
monitor during a first physical downlink control channel (PDCCH) monitoring occasion of a plurality of PDCCH monitoring occasions associated with paging within the POW, for the paging message in the first frequency subband; and
monitor during a second PDCCH monitoring occasion of the plurality of PDCCH monitoring occasions within the POW, for the paging message in the second frequency subband.

23. The first UE of claim 21, wherein the first UE is further configured to:
determine the frequency hopping pattern based on the frequency subband offset pattern for a plurality of PDCCH monitoring occasions within the POW and at least one of an initial bandwidth part (BWP) or an initial BWP hopping pattern.

24. The first UE of claim 21, wherein the first UE is further configured to:
refrain, in response to a detection of the paging message in the second frequency subband from the monitor, from performing additional frequency hopping in the POW.

25. The first UE of claim 21, wherein the first UE is further configured to:

refrain, in response to a detection of a physical downlink control channel (PDCCH) associated with paging in the second frequency subband from the monitor, from performing additional frequency hopping in the POW.

26. The first UE of claim 21, wherein the first UE is further configured to:
refrain, in response to a detection of a physical downlink control channel (PDCCH) including a paging termination indication in the second frequency subband from the monitor, from performing additional frequency hopping in the POW.

27. A first user equipment (UE) comprising
means for determining, based on a frequency subband offset pattern, a frequency hopping pattern for a paging occasion window (POW) in a plurality of frequency subbands within a shared radio frequency band; and
means for monitoring for a paging message from a network unit in the POW, wherein the means for monitoring for the paging message is configured to hop from at least a first frequency subband of the plurality of frequency subbands to a second frequency subband of the plurality of frequency subbands based on the frequency hopping pattern;
wherein the means for determining the frequency hopping pattern is configured to:
determine the frequency hopping pattern based on the frequency subband offset pattern for a plurality of PDCCH monitoring occasions within the POW and at least one of an initial bandwidth part (BWP) or an initial BWP hopping pattern.

28. A non-transitory computer-readable medium having program code recorded thereon, the program code comprising:
code for causing a first user equipment (UE) to determine, based on a frequency subband offset pattern, a frequency hopping pattern for a paging occasion window (POW) in a plurality of frequency subbands within a shared radio frequency band; and
code for causing the first UE to monitor for a paging message from a network unit in the POW, wherein the code for causing the first UE to monitor for the paging message is configured to hop from at least a first frequency subband of the plurality of frequency subbands to a second frequency subband of the plurality of frequency subbands based on the frequency hopping pattern,
wherein the code for causing the first UE to determine the frequency hopping pattern comprises:
code for causing the first UE to determine the frequency hopping pattern based on the frequency subband offset pattern for a plurality of PDCCH monitoring occasions within the POW and at least one of an initial bandwidth part (BWP) or an initial BWP hopping pattern.

* * * * *